United States Patent
Tehranipoor et al.

(10) Patent No.: US 10,181,065 B2
(45) Date of Patent: Jan. 15, 2019

(54) UNCLONABLE ENVIRONMENTALLY-SENSITIVE CHIPLESS RFID TAG WITH A PLURALITY OF SLOT RESONATORS

(71) Applicant: University of Florida Research Foundation, Incorporated, Gainesville, FL (US)

(72) Inventors: Mark M. Tehranipoor, Gainesville, FL (US); Haoting Shen, Tallahassee, FL (US); Kun Yang, Gainesville, FL (US); Domenic J. Forte, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 23 days.

(21) Appl. No.: 15/795,334

(22) Filed: Oct. 27, 2017

(65) Prior Publication Data

US 2018/0121689 A1    May 3, 2018

Related U.S. Application Data

(60) Provisional application No. 62/414,108, filed on Oct. 28, 2016.

(51) Int. Cl.

| | |
|---|---|
| *G06K 19/06* | (2006.01) |
| *G06K 7/10* | (2006.01) |
| *G06K 19/07* | (2006.01) |
| *G06K 19/067* | (2006.01) |
| *G07D 7/00* | (2016.01) |

(52) U.S. Cl.
CPC ..... *G06K 7/10366* (2013.01); *G06K 19/0672* (2013.01); *G06K 19/0723* (2013.01); *G07D 7/00* (2013.01)

(58) Field of Classification Search
USPC ............................. 235/492; 340/572.1–572.9
See application file for complete search history.

(56) References Cited

U.S. PATENT DOCUMENTS

| | | | |
|---|---|---|---|
| 8,502,677 B2* | 8/2013 | Pintos .................. | G06K 19/045 340/572.1 |
| 2015/0199602 A1* | 7/2015 | van der Weide .. | G06K 7/10366 340/10.1 |
| 2015/0310327 A1* | 10/2015 | Karmakar ............ | H01Q 1/2225 340/10.1 |

OTHER PUBLICATIONS

U.S. Department of Homeland Security, "Intellectual property rights seizure statistics: fiscal year 2014," 2015, pp. 1-12.
Kilcarr, "FreightWatch: cargo theft risk will rise in 2015," FleetOwner, Mar. 2015, pp. 1-2, http://www.fleetowner.com/fleet-management/freightwatch-cargo-theft-risk-will-rise-2015.
Xiaoyang et al., "An encryption method for QR code image based on ECA," International Journal of Security and its Applications, Sep. 2013, pp. 397-406, vol. 7, No. 5.

(Continued)

*Primary Examiner* — Jamara Franklin
(74) *Attorney, Agent, or Firm* — Alston & Bird LLP

(57) ABSTRACT

Chipless RFID tags and methods of using the same are provided. Each RFID tag provided herein can generate a unique and unclonable (unclonable chipless RFID, or UCR) identifier from its intrinsically random manufacturing process. The UCR device can monitor increase in storage temperature beyond that which is appropriate for a specific commodity to which the device is attached.

20 Claims, 13 Drawing Sheets

(56) References Cited

OTHER PUBLICATIONS

Sahu et al., "Encryption in QR code using stegnography," International Journal of Engineering Research and Applications, Jul.-Aug. 2013, pp. 1738-1741, vol. 3, No. 4.
Barrera et al., "Optical encryption and QR codes: secure and noise-free information retrieval," Optics Express, Feb. 2013, pp. 5373-5378, vol. 21, No. 5.
Hocquet et al., "Harvesting the potential of nano-CMOS for lightweight cryptography: an ultra-low-voltage 65 nm AES coprocessor for passive RFID tags," Journal of Cryptographic Engineering, Apr. 2011, pp. 1-8.
Batina et al., "Public-key cryptography for RFID-tags," Proceedings of the Fifth Annual IEEE International Conference on Pervasive Computing and Communications Workshops, Mar. 2007, pp. 1-16.
Lee et al., "Elliptic curve based security processor for RFID," IEEE Transactions on Computers, Nov. 2008, pp. 1-14.
Ha et al., "Replacing cryptography with ultra wideband (UWB) modulation in secure RFID," Proceedings of the 2007 IEEE International Conference on RFID, Mar. 2007, pp. 23-29.
Yu et al., "Securing RFID with ultra-wideband modulation," CiteSeer, 2006, pp. 1-12, http://citeseerx.ist.psu.edu/viewdoc/summary?doi=10.1.1.130.8658.
Sadeghi et al., "Enhancing RFID security and privacy by physically unclonable functions," Towards Hardware-Intrinsic Security, Oct. 2010, pp. 1-26.
Devadas et al., "Design and implementation of PUF-based 'unclonable' RFID ICs for anti-counterfeiting and security applications," Proceedings of the 2008 IEEE International Conference on RFID, Apr. 2008, pp. 58-64.
Gassend et al., "Silicon physical random functions," Proceedings of the 9th ACM Conference on Computer and Communications Security, Nov. 2002, pp. 1-13.
Preradovic et al., "Multiresonator-based chipless RFID system for low-cost item tracking," IEEE Transactions on Microwave Theory and Techniques, May 2009, pp. 1411-1419, vol. 57, No. 5.
Janaswamy et al., "Characteristic impedance of a wide slotline on low-permittivity substrates," IEEE Transactions on Microwave Theory and Techniques, Aug. 1986, pp. 900-902, vol. MTT-34, No. 8.
Ahmed et al., "Dielectric properties of butter in the MW frequency range as affected by salt and temperature," Journal of Food Engineering, Oct. 2007, pp. 351-358, vol. 82.
Akansu et al., "Emerging applications of wavelets: a review," Physical Communication, Mar. 2010, pp. 1-18, vol. 3.
Sareni et al., "Effective dielectric constant of random composite materials," Journal of Applied Physics, Mar. 1997, Author Copy, pp. 1-9.
Shlens, "A tutorial on principal component analysis," Cornell University Library, arXiv, Apr. 2014, pp. 1-12, https://arxiv.org/pdf/1404.1100.pdf.
Silva et al., "Speeding up all-pairwise dynamic time warping matrix calculation," Proceedings of the 2016 SIAM International Conference on Data Mining, May 2016, pp. 1-9.
Bishop et al., "UPC bar code has been in use 30 years / once-controversial technology is now ubiquitous," SFGATE, Jul. 2004, pp. 1-3.
Liu et al., "Recognition of QR code with mobile phones," 2008 Chinese Control and Decision Conference, Jul. 2008, pp. 203-206.
Preradovic et al., "Design of fully printable planar chipless RFID transponder with 35-bit data capacity," Proceedings of the 39th European Microwave Conference, Sep.-Oct. 2009, pp. 13-16.
Islam et al., "A novel compact printable dual-polarized chipless RFID system," IEEE Transactions on Microwave Theory and Techniques, Jul. 2012, pp. 2142-2151, vol. 60, No. 7.
Preradovic et al., "Chipless RFID: bar code of the future," IEEE Microwave Magazine, Dec. 2010, pp. 87-97.
"Radio frequency fundamentals," Cisco Connected Mobile Experiences (CMX) CVD, Sep. 2014, Chapter 10, pp. 1-6.
Izenman, "Linear discriminant analysis," Modern Multivariate Statistical Techniques, 2013, pp. 237-280.
Yang et al., "UCR: an unclonable chipless RFID tag," 2016 IEEE International Symposium on Hardware Oriented Security and Trust, May 2016, pp. 7-12.

\* cited by examiner

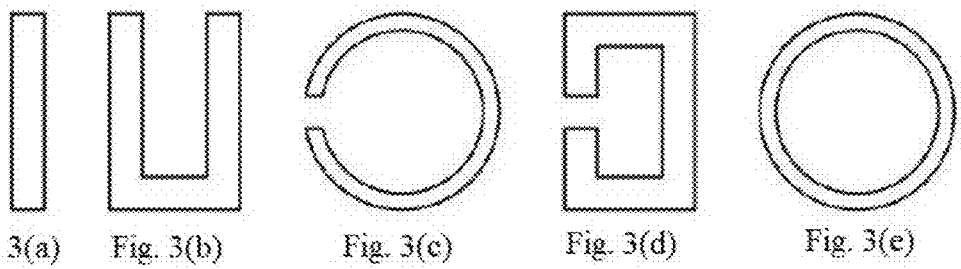
Fig. 3(a)   Fig. 3(b)   Fig. 3(c)   Fig. 3(d)   Fig. 3(e)
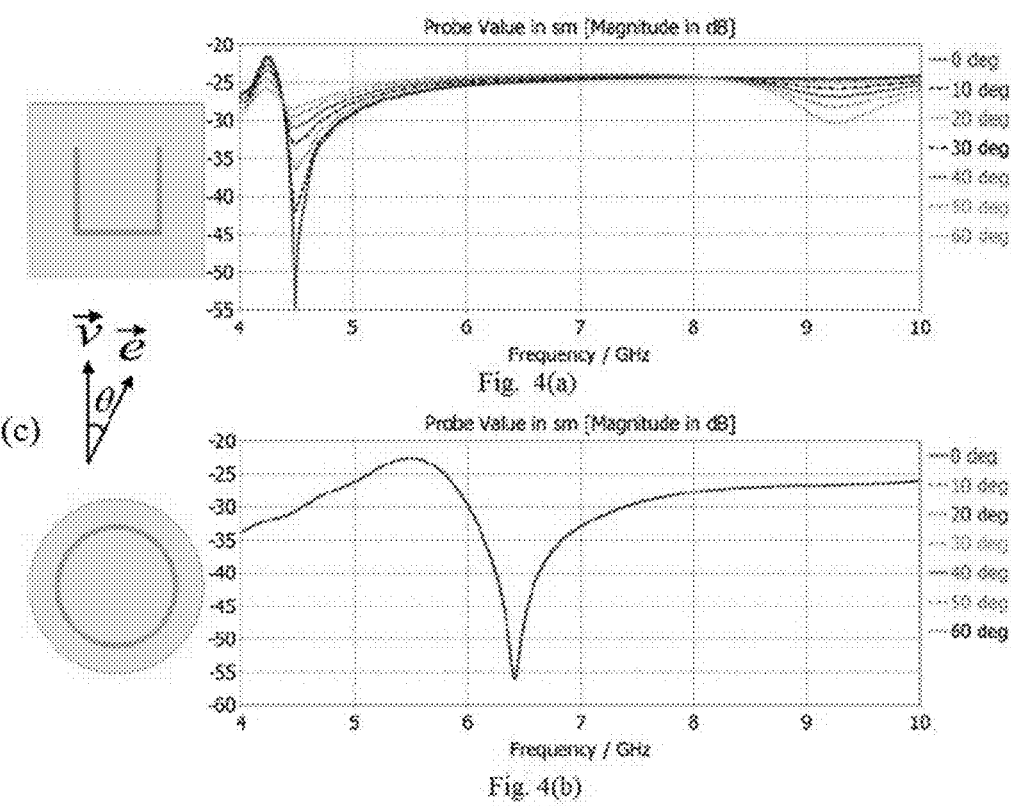
Fig. 4(a)
Fig. 4(c)
Fig. 4(b)

20 mm

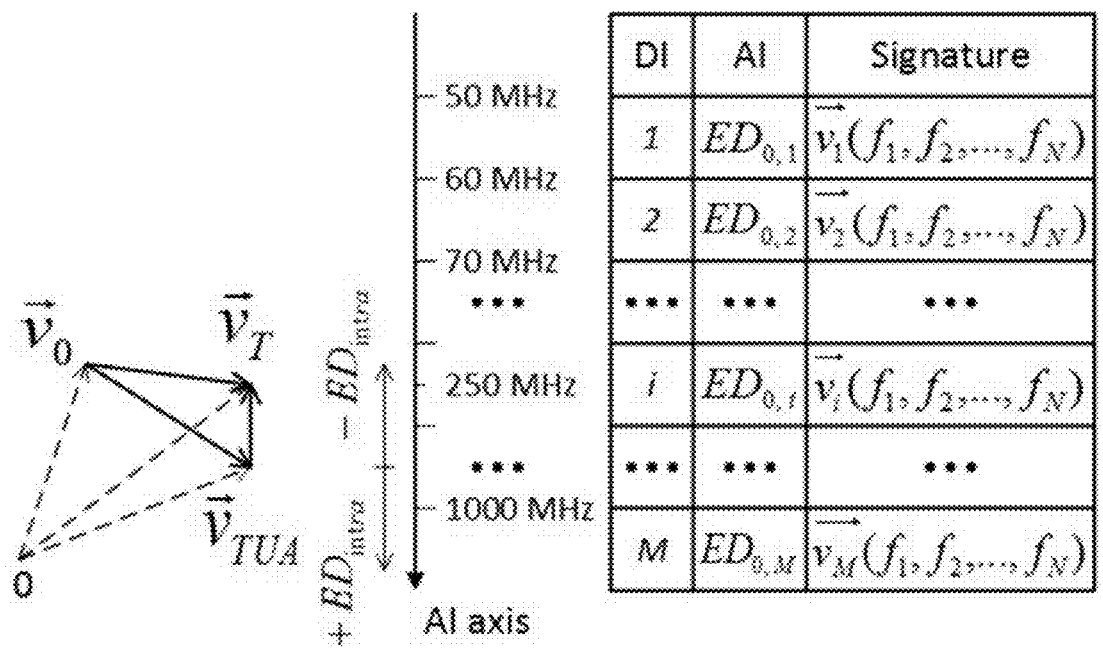
Fig. 9(a)                     Fig. 9(b)
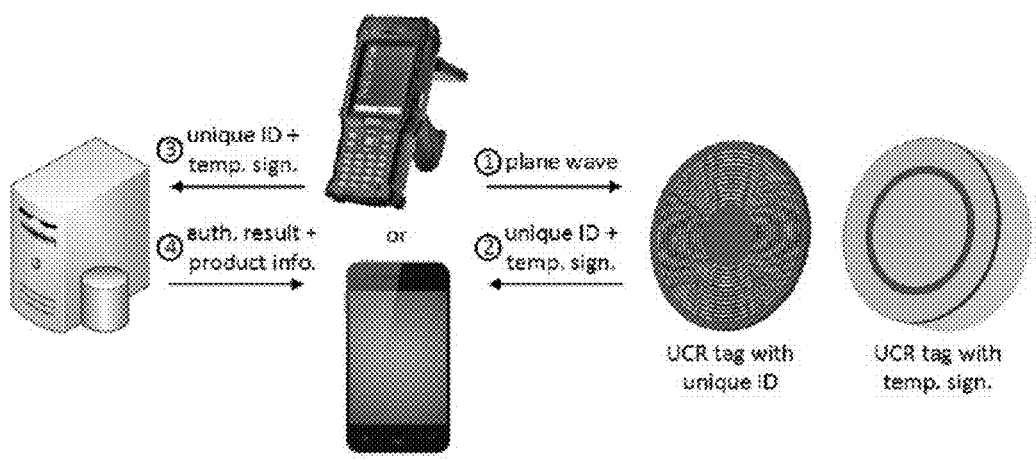
Fig. 10

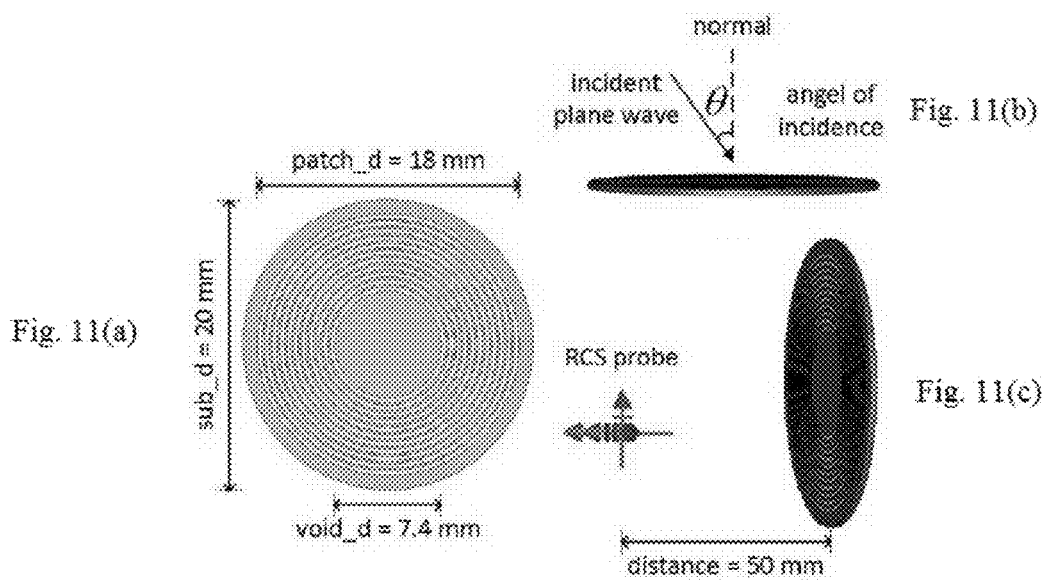
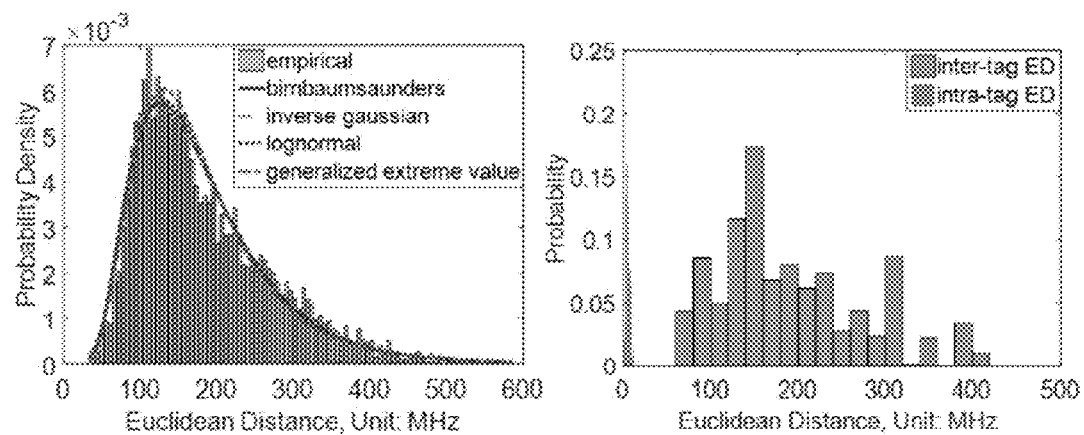
Fig. 12(a)                              Fig. 12(b)

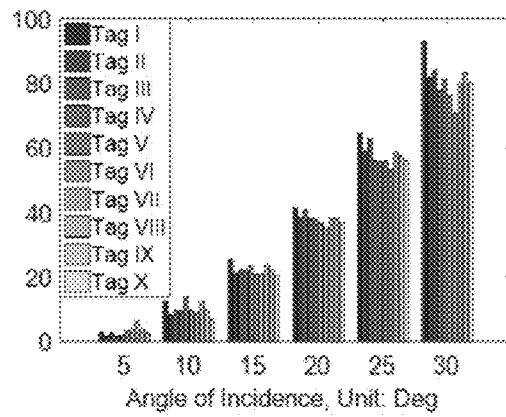 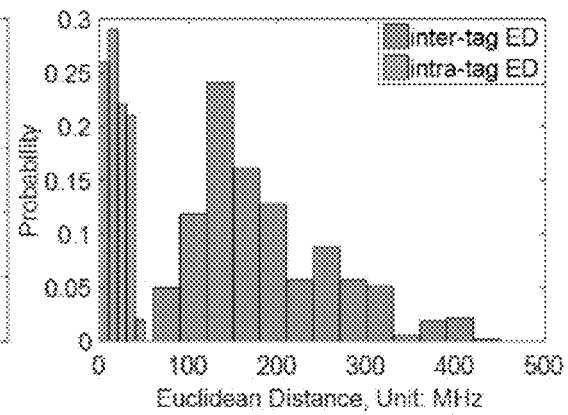

Algorithm 1 UCR tag authentication

1: procedure AUTHENTICATE($\vec{v}_{TUA}$)
2: 　　$\vec{v}_{TUA} \leftarrow$ The signature of TUA
3: 　　$\vec{v}_{DI(k)} \leftarrow$ The signature of TUA's $k_{th}$ nearest neighbor on the axis, whose DI is $DI(k)$
4: 　　$ED_{0,TUA} \leftarrow$ The Euclidean distance between design value and TUA
5: 　　$ED_{0,DI(k)} \leftarrow$ The Euclidean distance between design value and TUA's $k_{th}$ nearest neighbor on the axis
6: 　　while $|ED_{0,TUA} - ED_{0,DI(k)}| \leq ED_{intra}$ do
7: 　　　　if $|\vec{v}_{TUA} - \vec{v}_{DI(k)}| \leq ED_{intra}$ then
8: 　　　　　　printf("TUA matches with Tag %d.", $DI(k)$)
9: 　　　　　　goto 15
10: 　　　else
11: 　　　　　　$k \leftarrow k+1$
12: 　　　end if
13: 　　end while
14: 　　printf("TUA does not belong to the database.")
15: end procedure

Fig. 13

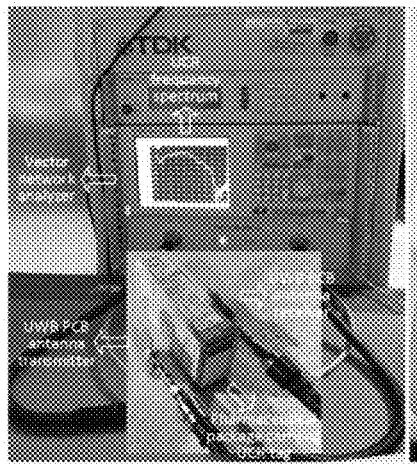
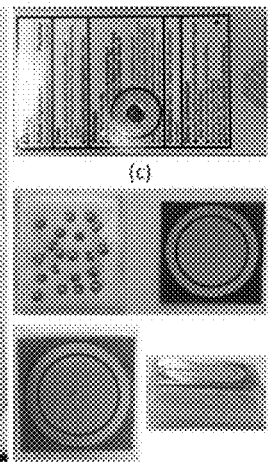
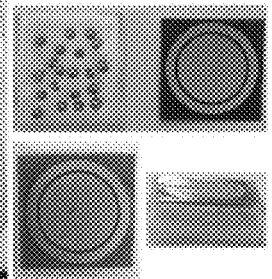
Fig. 14(a)  Fig. 14(b)  Fig. 14(d)
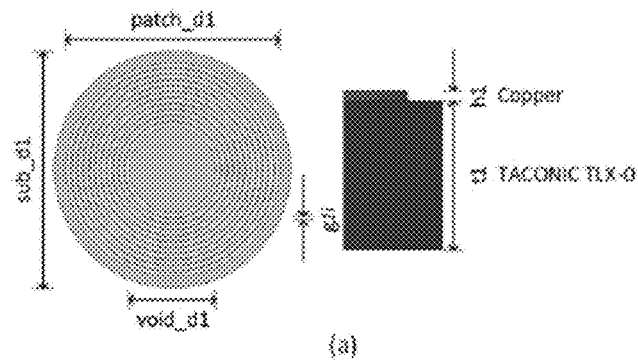
Fig. 15(a)
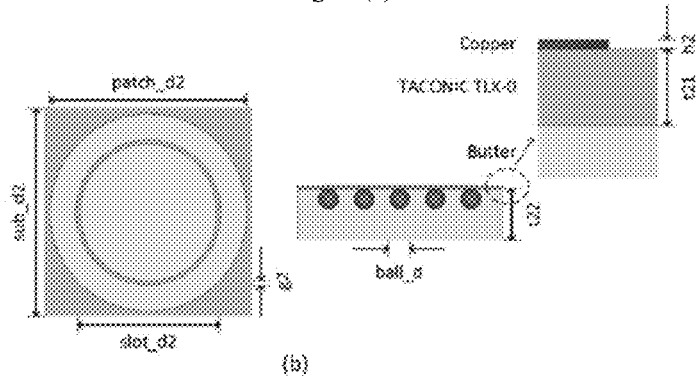
Fig. 15(b)

(a)

(b)

UNCLONABLE ENVIRONMENTALLY-SENSITIVE CHIPLESS RFID TAG WITH A PLURALITY OF SLOT RESONATORS

CROSS-REFERENCE TO RELATED APPLICATION

This application claims the benefit of U.S. Provisional Patent Application Ser. No. 62/414,108, filed Oct. 28, 2016, which is incorporated herein by reference in its entirety, including any figures, tables, and drawings.

STATEMENT OF GOVERNMENT SUPPORT

This invention was made with government support under grant number FA9550-14-1-0351 awarded by the United States Air Force Office of Scientific Research. The government has certain rights in the invention.

BACKGROUND

Today's supply chain is highly complex, diverse, and extensive. While globalization has optimized resource allocation and reduced manufacturing cost, it also exposes the supply chain to more risks, such as counterfeiting and theft. As a result, track-and-trace technologies have become increasingly important for protecting commercial and personal assets against various adversaries experienced during supply chain distribution. Though current track-and-trace technologies provide manufacturers, distributors, and retailers with systematic methods to detect and control these adversaries, they oftentimes can be cost-ineffective, inefficient, and/or insecure.

Traditionally, both barcodes and quick response (QR) codes have been used to track and trace commodities in the supply chain [3,4]. Though these codes (e.g., QR codes) can be encrypted to inhibit unauthorized access [5,6], they are easily duplicable due to the visibility and controllability of the pixel information revealed therein. In addition, other shortcomings such as, for example, requirement of individual scanning, direct line of sight between the reader and the code, and close proximity to reader all severely impact the overall utility of traditional track-and-trace technologies.

Radio frequency identification (RFID) is growing in popularity as a replacement of barcodes and QR codes in various industries such as commercial retail and governmental agencies [8]. Compared to barcodes and QR codes, an RFID-based scheme supports batch-scanning, does not require a direct line of sight for access, and needs less human involvement to collect data, making automated track-and-trace possible. A series of encryption techniques such as, for example, advanced encryption standard (AES), public-key cryptography, and elliptic curve cryptography (ECC), have been proposed to enhance the security and privacy of RFID tags [9-11]. Despite these enhanced security measures, however, the relatively higher price of an RFID tag limits its applications in the supply chains of low-cost commodities.

Recently, cost-effective RFID tags that do not contain a microchip (i.e., chipless) in the transponder have gained interest due to extremely low price (as low as 0.1 cents) that enables their applications in the supply chain of low-cost commodities, and elimination of tag memory that protects commodities from the threat of denial-of-service attack performed in the form of overwriting tag memory.

Currently available chipless RFID tags, however, require either the removal or shorting of some resonators (e.g., spirals slots or patch slots) from the tag substrate in order to encode data [17-19]. When one resonator is removed or shorted, the resonance point associated with that resonator will be either removed from the spectrum or shifted outside of the frequency band of interest. One bit is encoded to '1' when the corresponding resonance point exists at a specific frequency, and '0' when the resonance point disappears, or vice versa. Removal of resonators will incur a waste of tag area. Shorting resonators ensures that the same layout with all the resonators shorted can be used to produce different chipless RFID tags. When encoding data, the shorting can be removed using laser cutting or conventional etching techniques. Removing and shorting resonators will increase the manufacturing time and/or cost of chipless RFID tags. Furthermore, the IDs generated by these chipless RFID tags are deterministic and predictable, and thus are easily clonable. Small ID size not exceeding 35 bits and large tag area also limit the utility of conventional chipless RFID tags.

For certain commodities such as, for example, pharmaceuticals, food, and beverages, it is necessary or desirable to monitor environmental factors such as storage temperature during distribution in order to keep the efficacy, quality, and/or flavor of the commodities in check. However, currently there is no cost-effective solution for tracking the temperatures of commodities utilizing existing track-and-trace technologies.

BRIEF SUMMARY

Embodiments of the subject invention provide novel and advantageous chipless RFID tags and methods of using the same. Each RFID tag can generate a unique and unclonable (unclonable chipless RFID, or UCR) identifier from its intrinsically random manufacturing process. In some embodiments, the UCR device can monitor increase in storage temperature beyond that which is appropriate for a specific commodity to which the device is attached. In some embodiments, the UCR device can further comprise an additional ring slot resonator fabricated on a second substrate that is responsive to increase in temperature of the tag. Methods of enrolling and authenticating the UCR devices for track-and-trace applications are also provided.

In an embodiment, a chipless RFID tag for tracking a product can comprise: a first substrate; and a plurality of slot resonators fabricated on the first substrate, wherein each slot resonator has a characteristic resonance frequency value that randomly deviates from a theoretical resonance frequency value determined by the geometric dimensions and material properties of both the slot resonators and the first substrate, and wherein the resonance frequency signature of the tag is a collection of each of the plurality of slot resonators' resonance frequency value. The tag can be integrated with, attached to, or printed on the product or a package thereof.

BRIEF DESCRIPTION OF THE DRAWINGS

FIG. 2A shows the sensitivity to air gap, FIG. 2B shows the sensitivity to substrate thickness, and FIG. 2C shows the sensitivity to relative permittivity.

FIGS. 3A-3E illustrate five different slot resonator geometries including I-shaped (FIG. 3A), U-shaped (FIG. 3B), C-shaped (FIG. 3C), split square-shaped (FIG. 3D), and circular ring-shaped (FIG. 3E).

FIGS. 4A-4C illustrate the responses of resonators with two different geometries measured at different angles between the slot direction and the polarization direction of an incident plane wave (schematic of the angle is shown in FIG. 4C): a U-shaped slot resonator (FIG. 4A) and a circular ring-shaped slot resonator (FIG. 4B).

FIGS. 5C and 5D illustrate, respectively, the resonance frequency of the UCR device with a configuration shown in FIGS. 5A and 5B.

FIG. 9A shows the triangle inequality relationship between $\vec{v}_T$, $\vec{v}_0$, and $\vec{v}_{TUA}$. FIG. 9B illustrates a look-up table that stores all the signatures of valid UCR tag identifiers.

FIG. 10 shows the communication flow between various devices involved in authenticating a UCR tag according to an embodiment of the subject invention in a real application scenario involving an RFID reader or a smart cellular phone.

FIGS. 11A-11C illustrate various parameters and setup required for simulating performance of a UCR tag according to an embodiment of the subject invention. FIG. 11A shows the dimensions of the UCR tag, FIG. 11B defines the angle of incidence, and FIG. 11C shows the distance between an radio cross-section (RCS) probe and the UCR tag.

FIG. 12A shows a distribution of Euclidean distances calculated for exemplary UCR tags. FIG. 12B shows a distribution of Euclidean distances of the UCR tags in the presence of random white Gaussian noise (WGN) with a signal-to-noise ratio (SNR) of 10 dB. FIG. 12C is a comparison of Euclidean distances between 10 exemplary UCR tags relative to zero incident angle. FIG. 12D shows distribution of Euclidean distance of the UCR tags when angle of incidence varies from 0° to 20°.

FIG. 13 illustrates the algorithm employed in a UCR tag authentication system according to an embodiment of the subject invention.

FIG. 14A shows an experimental setup.

FIG. 14B shows a Barnstead Thermolyne hotplate.

FIG. 14C shows an UCR part I prototype attached to a pharmaceutical package.

FIG. 14D shows an UCR part II prototype.

FIG. 15A shows a layout of an UCR part I.

FIG. 15B shows a layout of an UCR part II.

DETAILED DESCRIPTION

Figure 1:
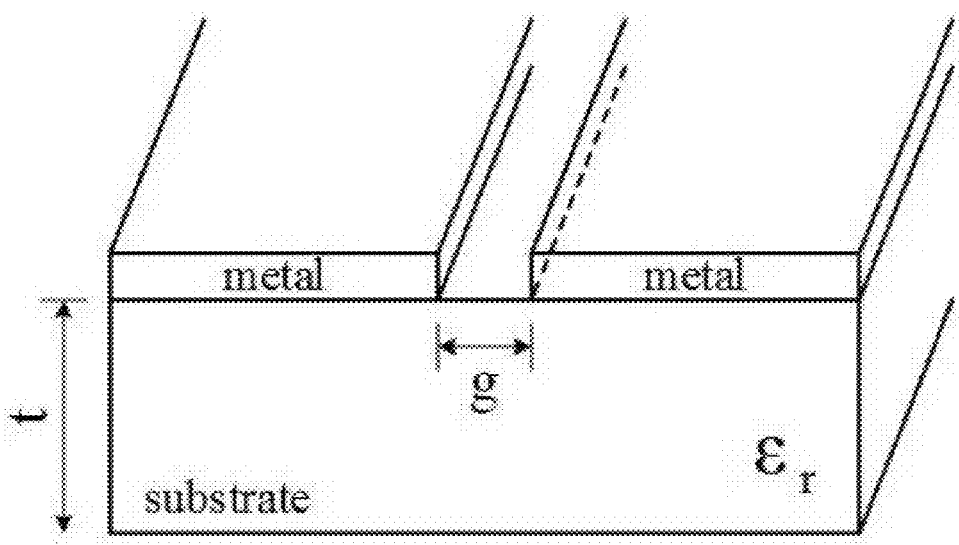
FIG. 1 is a cross-sectional view of a slot line between two resonators.

Embodiments of the subject invention provide chipless RFID tags and methods of using the same. Each RFID tag can generate a unique and unclonable (unclonable chipless RFID, or UCR) identifier from its intrinsically random manufacturing process. In some embodiments, the UCR device can monitor increase in storage temperature beyond that which is appropriate for a specific commodity to which the device is attached.

Advantageously, due to their enhanced security, lower cost, and ease of use, UCR tags provided herein can be used in a wide variety of applications including, but not limited to, monitoring security during supply chain process, maintaining security in various forms of identification (e.g., passports and driver's licenses), and enabling non-electronic products to be connected to the network for the expansion of the scope of the Internet of Things (IoT).

In one aspect, a chipless RFID tag can comprise a plurality of slot resonators fabricated on a substrate, wherein each slot resonator has a resonance frequency whose theoretical design value is dependent upon factors such as, for example, the geometry of the resonator, the trace width of the slots, the air gap between the slots, the thickness and the dielectric constant of the substrate. During the manufacturing process, however, the resonance frequency of each resonator randomly deviates from its design value, producing a frequency signature (i.e., a collection of all the resonance frequency values of the resonators) that is unique and unclonable when used as the tag's identifier.

In some embodiments, each slot resonator comprises, substantially or completely, a material having a moderate to high conductivity such as, for example, an elemental or alloyed metal. In some embodiments, the slot resonator comprises, substantially or completely, a conductive epoxy, conductive nanoparticles, or conductive nanowires. In some embodiments, the slot resonator comprises, substantially or completely, carbon nanotubes or graphene nanoribbons.

In some embodiments, each slot resonator comprises, substantially or completely, a conductive ink. The conductive ink may be applied to the substrate by a printing technique, the printing technique selected form a letterpress technique, a digital technique (including, but not limited to, electrophotography, inkjet, xerography, and laser), a gravure printing technique, a screen printing technique, a vacuum deposition technique, a 3D technique, a lithography technique, a thermography technique, a reprographic technique, a flexography technique, or an electrostatic technique.

In some embodiments, the slot resonators can be I-shaped, U-shaped, C-shaped, split square-shaped, or circular ring-shaped (FIGS. 3A-3E). While different geometries correspond to different equivalent circuits with varying resonance characteristics, those skilled in the art would readily recognize that other geometries such as, for example, L-shape, spiral, patch, or hairpin can also be employed in the UCR tags of embodiments of the subject invention. In some embodiments, circular ring-shaped slot resonators are employed in the UCR tags provided herein due to the following two reasons.

First, the circular ring-shaped resonators do not require the incident plane wave to be in perfect alignment with the UCR tag, eliminating the requirement of placing the tag in the direct line of sight of the RF reader. By comparison, for a U-shaped resonator (FIG. 4A), if the angle (θ) between the slot direction ($\vec{v}$) and the linear polarization direction ($\vec{e}$) of the incident plane wave exceeds a critical value, the backscattered response from the resonator will be too weak to be measured. This is due to the fact that most components of the incident plane are used to stimulate the horizontal slot rather than the vertical slot, resulting in an additional resonance point at a frequency higher than 9 GHz. In contrast, the backscattered response from a circular ring slot resonator advantageously remains the same regardless of the fact that most components of the incident plane wave serve to stimulate the horizontal slot rather than the vertical slot (FIG. 4B).

Second, the fabrication process of the circular ring-shaped slot resonators is more difficult to control in comparison to other geometries, leading to greater variations between the theoretical and manufactured resonance frequency signatures, which can in turn serve as the basis for generating unique identifiers in the UCR tags.

In some embodiments, the resonance frequency of each slot resonator is dependent upon various parameters including, but not limited to, air gap g between two resonators, substrate thickness t, and relative permittivity of the substrate material $\varepsilon_r$. FIG. 1 illustrates a cross-sectional view of a slot line between two resonators with the parameters labeled. The terms "notch frequency" and "slot resonance frequency" are used interchangeably hereafter.

In an embodiment in which $2:22 \leq \varepsilon_r \leq 3:8$, $0:0015 \leq g/\lambda_0 \leq 0:075$ and $0:006 \leq t/\lambda_0 \leq 0:06$, the normalized wavelength of a slot line can be approximated by the following equations:

$$\lambda_s/\lambda_0 = F(g, t, \varepsilon_r) - G(\varepsilon_r) \cdot \ln(t/\lambda_0) \tag{1}$$

where $$F(g, t, \varepsilon_r) = 1.045 - 0.365 \ln \varepsilon_r + \frac{0.063 g \varepsilon_r^{0.945}}{g + 2.3864 t} \tag{2}$$

and $$G(\varepsilon_r) = 0.0599 - \frac{0.083695}{\varepsilon_r} \tag{3}$$

where $\lambda_s$ and $\lambda_0$ represent the slot-guided wavelength and the free space wavelength, respectively [21]. The slot length L of a half-wavelength slot-line resonator can be described by the following equation:

$$L = \lambda_s/2 \tag{4}$$

while the free space wavelength $\lambda_0$ can be computed as $$\lambda_0 = c/f_s \tag{5}$$

where c and $f_s$ refer to the speed of light in vacuum and the notch frequency of each slot-line resonator, respectively. Furthermore, for a frequency band between about 4 GHz and about 10 GHz, these conditions correspond to an air gap between about 0.1125 mm and about 2.25 mm, and a substrate thickness between about 0.45 and about 1.8 mm.

In some embodiments, the notch frequency $f_s$ can be derived from Equations 1, 4 and 5 as the following:

$$f_s = \frac{c}{t} \exp\left(\frac{cF - 2Lf_s}{cG}\right) \tag{6}$$

Thus, the partial derivatives of notch frequency $f_s$ with respect to air gap g and substrate thickness t can be described as $$\frac{\partial f_s}{\partial g} = \frac{c\Phi \frac{\partial F}{\partial g}}{tG + 2L\Phi} \tag{7}$$

$$\frac{\partial f_s}{\partial t} = \frac{cG\Phi \frac{\partial F}{\partial t} - Gf_s}{tG + 2L\Phi} \tag{8}$$

where $$\frac{\partial f_s}{\partial \varepsilon_r} = \frac{\Phi\left[cG \frac{\partial F}{\partial \varepsilon_r} + (2Lf_s - cF)\frac{\partial G}{\partial \varepsilon_r}\right]}{tG^2 + 2LG\Phi} \tag{9}$$

$$\Phi = \exp\left(\frac{cF - 2Lf_s}{cG}\right) \tag{10}$$

Further, based on Equations 2 and 3 the partial derivatives of F and G can be computed as $$\frac{\partial F}{\partial g} = \frac{0.1503432 t \varepsilon_r^{0.945}}{(g + 2.3864t)^2} \tag{11}$$

$$\frac{\partial F}{\partial t} = -\frac{0.1503432 g \varepsilon_r^{0.945}}{(g + 2.3864t)^2} \tag{12}$$

$$\frac{\partial F}{\partial \varepsilon_r} = -\frac{0.365}{\varepsilon_r} + \frac{0.059535 g \varepsilon_r^{-0.055}}{g + 2.3864t} \tag{13}$$

$$\frac{\partial G}{\partial \varepsilon_r} = \frac{0.083695}{\varepsilon_r^2} \tag{14}$$

In some embodiments, the substrate material on which the slot resonators are fabricated is a non-conductive material, a dielectric material, or a combination thereof. In certain embodiments, the substrate is coated with a conductive material at the surface. In exemplary embodiments, the substrate comprises, substantially or completely, a synthetic polymer (e.g., epoxy), ceramic (e.g., glass), microfiber, hydrocarbon, or a composite thereof.

In some embodiments, the substrate material has a relatively low and stable dielectric constant (i.e., relative permittivity) over a range of temperature and frequency. The substrate material can have a dielectric constant in the range of from 2 (or about 2) to 10 (or about 10). Exemplary embodiments provide that the substrate material is a ceramic-reinforced polymer composite that is optionally covered with a layer of metallic material at its surface. In more preferred embodiments, the composite material is glass-reinforced poly(tetrafluoroethylene) (PTFE) optionally electrodeposited with copper. Examples of the substrate material include, but are not limited to, those listed in Table II.

In some embodiments, the substrate is planar or substantially planar. In exemplary embodiments, the substrate is integrated directly with, or substantially a part of, components of products needing to be traced and/or authenticated. In an embodiment, the substrate is integrated with the printed circuit board (PCB) of an electronic product. In another embodiment, the UCR tag can be integrated to the package of a product (e.g., on the backside of bottle cap). In yet another embodiment, the UCR tag can be printed on the products or packages thereof with conductive ink.

Further embodiments provide that each UCR tag additionally comprises a standalone slot resonator fabricated atop a temperature-sensitive substrate whose change in properties can be an indicator of whether the tagged product has been exposed to excessive temperature during its supply chain process (FIGS. 7A-7D). This is especially advantageous for the monitoring of the safety and efficacy of commodities such as, for example, food, beverages, pharmaceuticals, cosmetics, newspapers, and magazines.

In some embodiments, the temperature-sensitive substrate comprises materials that change in physical properties when temperature transitions past a critical value (e.g., melting point). Examples of substrate materials provided herein include, but are not limited to, ice, grease, and wax. Specific choices of substrate material are dependent upon the application of the UCR tags and the commodities being tagged.

In some embodiments, metallic particles are embedded within the substrate material. In an exemplary embodiment, the particles comprise an elemental or alloyed metal (e.g., copper, steel, aluminum, etc.). The particles can also comprise other materials, provided that the relative permittivity is (significantly) larger than that of the substrate material. A suitable particle size (i.e., diameter) depends on the feature size of the resonator and the number of particles desired and can be, for example, between 0.2 mm (or about 0.2 mm) and 2.0 mm (or about 2.0 mm). In an embodiment, when the number of particles is equal to 25 and the diameter of slot ring resonator ranges from 7 to 14 mm, the diameter of the particle ranges from 1 mm (or about 1) to 2 mm (or about 2 mm). When the substrate changes physical property (e.g., state of matter) due to a change in temperature, the particles are free to move toward the bottom surface of the substrate.

Figure 7A:
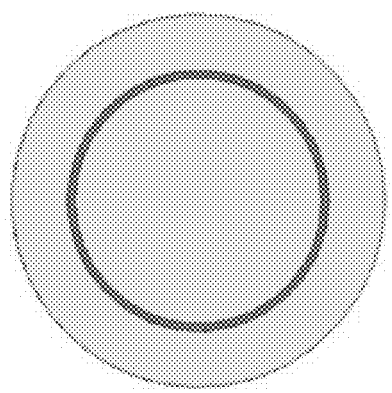
FIGS. 7A-7D illustrate an exemplary standalone ring slot resonator fabricated on a temperature-sensitive substrate (e.g., grease) in a top view (FIG. 7A), in a top perspective view (FIG. 7B), in a side view before the grease melts (FIG. 7C), and in the same side view after the grease melts (FIG. 7D).
Figure 7B:
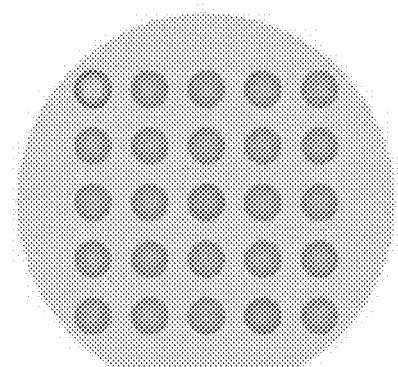
Figure 7C:
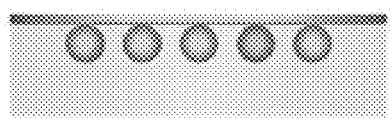
Figure 7D:
Figure 8:
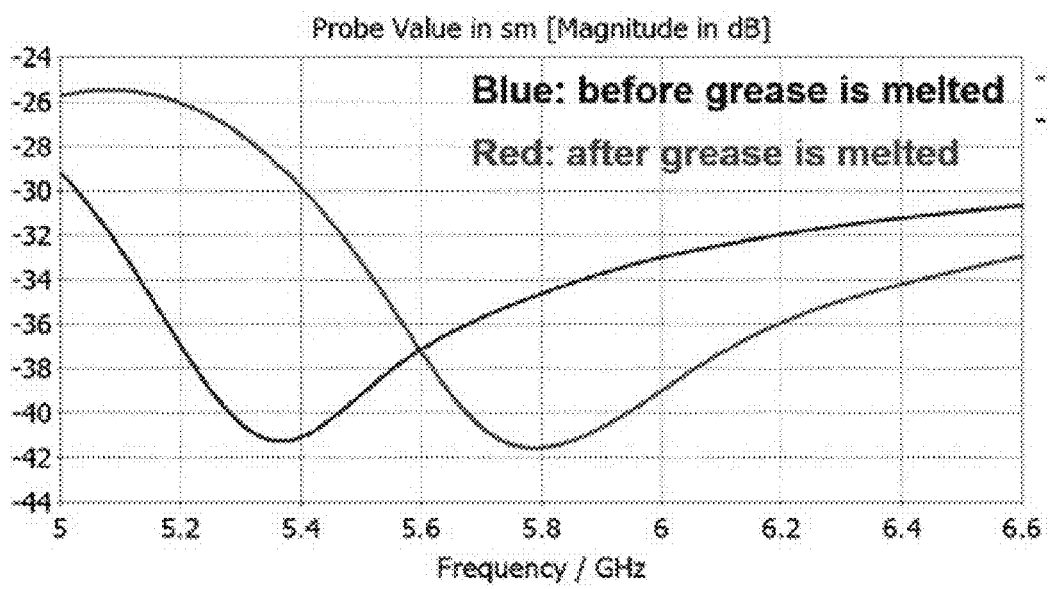
FIG. 8 is a spectrum of frequency response of a UCR tag according to an embodiment of the subject invention being subjected to temperature transition.

As shown in FIGS. 7B-7C, an embodiment of the subject invention provides a substrate material (e.g., ice, grease, or wax) that melts at a high temperature. A "high temperature" as used in this context can vary depending on the specific applications in which the slot resonators are employed. For example, for frozen seafood, 32° F. (i.e., approximately 0° C.) is considered a high temperature, in which case ice can be used as a substrate material as it begins to melt at or around 0° C. In other applications (e.g., chemicals, medications, etc.) for which 100° F. (i.e., approximately 35° C.) is considered a high temperature, grease can be used as an appropriate substrate material. Similar to the slot resonators designed to generate unique identifiers for UCR tags, this standalone resonator has a characteristic resonance frequency that is dependent upon slot parameters, substrate dielectric constant, substrate thickness, and ambient temperature. When the ambient temperature exceeds the melting temperature of the substrate, copper particles move downward within the vicinity of the substrate, thereby changing the distribution of the electromagnetic field within the substrate (FIG. 7D). As a result, the resonance frequency of the standalone slot resonator shifts to a higher value than before the substrate melts (FIG. 8).

In some embodiments, the standalone resonator with its temperature-sensitive substrate is located in the vicinity of the plurality of slot resonators.

Methods of enrolling and authenticating the UCR tags provided herein for track-and-trace applications are also provided herein.

In some embodiments, enrollment comprises determining the theoretical resonance frequency signature of the tag based on various slot and substrate parameters ($\vec{v}_0$), determining the characteristic signature of each tag (e.g., $\vec{v}_1, \vec{v}_2, \ldots, \vec{v}_M$ where 1, 2, ... M denote each distinct tag.) after stimulating the tag with an RF source, calculating the Euclidean distance ($ED_0,i$) (i.e., the analog index, or AI) between the theoretical signature and the characteristic signature for each tag, assigning a digital index (DI) to each AI, and storing each tag's signature with its appended AI and DI in a database for future look-up and authentication (FIG. 9).

Embodiments of the subject invention also include methods of authenticating a UCR tag provided herein. In an embodiment, an authentication method can comprise scanning the UCR tag with an RF source, determining the characteristic signature ($\vec{v}_{TUA}$) of the tag under authentication (TUA), calculating the Euclidean distance ($ED_{0,TUA}$) between a known theoretical signature ($\vec{v}_0$) and the $\vec{v}_{TUA}$, using the $ED_{0,TUA}$ to locate the AI of the TUA in the database, determining the Euclidean distance ($ED_{0,DI(k)}$) between $\vec{v}_0$ and the signature of the TUA's nearest neighbor ($\vec{v}_{DI(k)}$), comparing $|ED_{0,TUA}-ED_{0,DI(k)}|$ and the maximum intra-tag Euclidean distance ($ED_{intra}$), and verifying whether the TUA exists in the database.

In certain embodiments, the authentication process relies on an algorithm (as shown in FIG. 13) that will automatically terminate if the signature of TUA matches with its $k^{th}$ nearest neighbor; otherwise, its $(k+1)^{th}$ nearest neighbor will be evaluated. This algorithm will also terminate if a shift value defined as $|ED_{o,TUA}-ED_{0,DI(k)}|$ on the AI axis has exceeded $ED_{intra}$, indicating that the TUA does not belong to the current database. If a tag record ($\vec{v}_T$) is found to be $\vec{v}_{TUA}$, then the existence of the TUA in the database can be validated using the following V TUA triangle inequality relationship:

$$||\vec{v}_T-\vec{v}_0|-|\vec{v}_{TUA}-\vec{v}_0|| \leq |\vec{v}_T-\vec{v}_{TUA}| \leq ED_{intra} \qquad (16)$$

In other words, it is a presupposition that the shift value on the AI axis between the TUA and an existing target tag whose signature is $\vec{v}_T$ should not be larger than $ED_{intra}$. In preferred embodiments, there will be only one tag satisfying the condition $|\vec{v}_{TUA}-\vec{v}_{DI(k)}| \leq ED_{intra}$, which is the target tag if it exists, so long as there is no overlapping between the inter-tag and intra-tag Euclidean distance distributions.

In certain embodiments wherein the number of UCR tags in the database is extremely large, that inter-tag and intra-tag Euclidean distance distributions may overlap with each other. $\vec{v}_T$ In that case multiple tag records (i.e., multiple distinct $\vec{v}_T$) could potentially match with the signature of the TUA, and the one nearest in Euclidean distance to the TUA will be selected. Preferably, increasing the feature space (i.e., the number of resonance points on the frequency spectrum of the UCR tags) reduces the likelihood of overlapping distributions, enhancing the probably of locating an exact match. Advantageously, the utilization of the algorithm significantly reduces the look-up time in comparison with exhaustive search strategies employed by prior-art track-and-trace technologies.

Figures 5A, 5B, 5C, 5D:
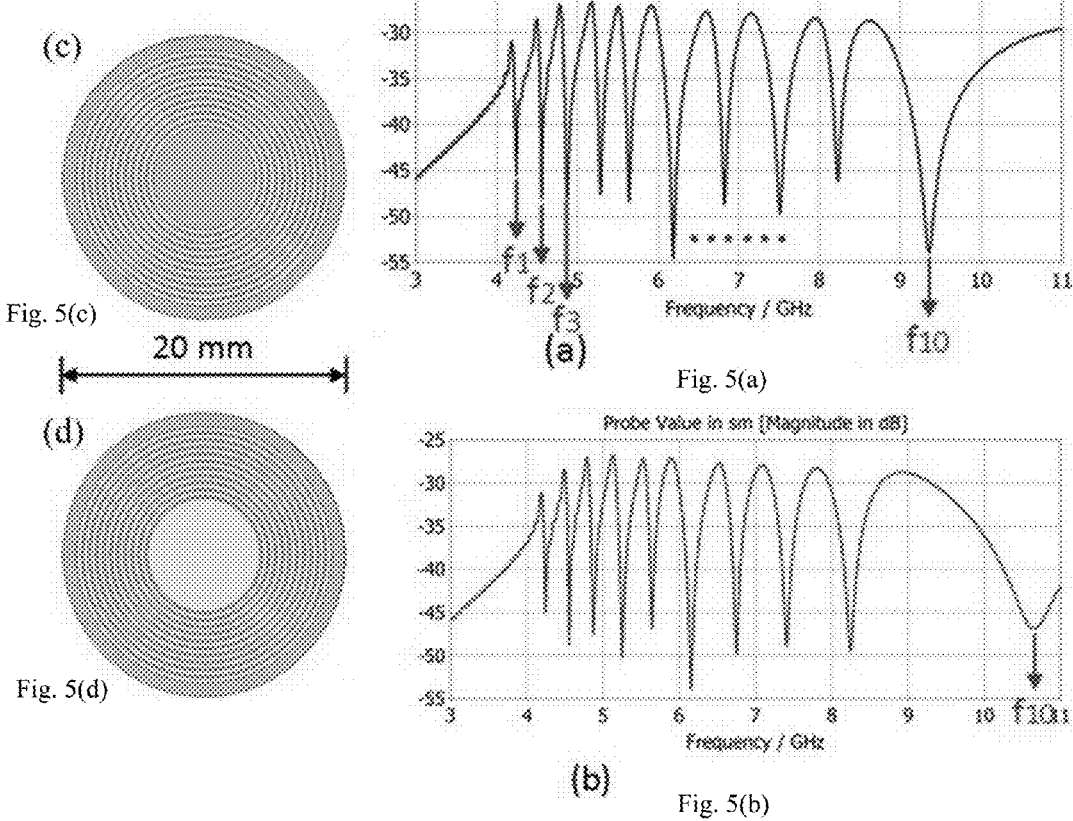
FIGS. 5A-5D demonstrate the configuration of a UCR tag according to an embodiment of the subject invention comprising concentric ring slot resonators with the central circular pad void (FIG. 5A) and with the central circular pad filled with resonator material (FIG. 5B).
Figure 6A:
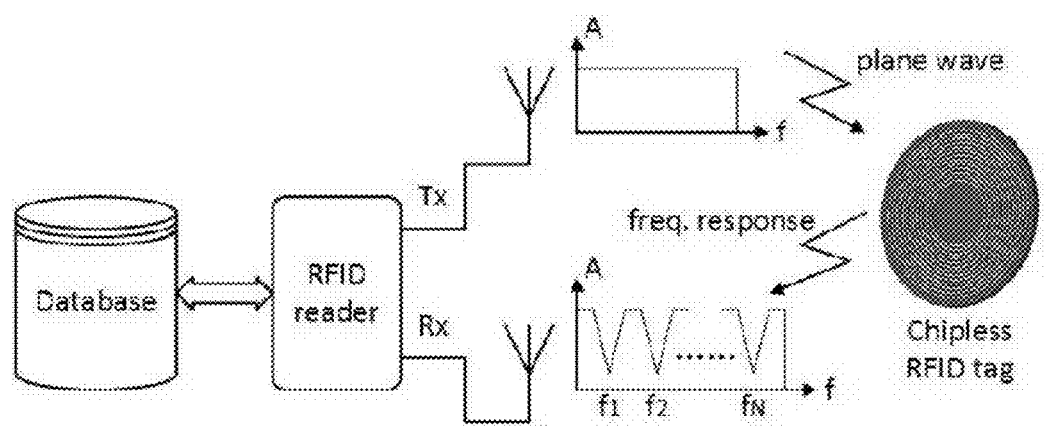
FIGS. 6A-6C demonstrate the working principle of a UCR tag according to an embodiment of the subject invention (FIG. 6A), of an enrollment process according to an embodiment of the subject invention (FIG. 6B), and of an authentication process according to an embodiment of the subject invention (FIG. 6C).
Figure 6B:
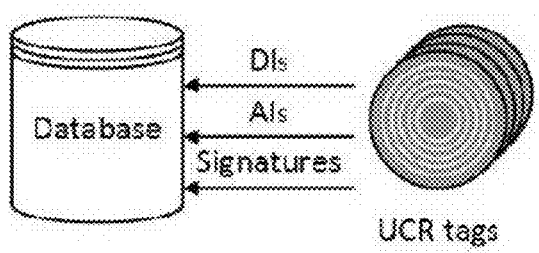
Figure 6C:
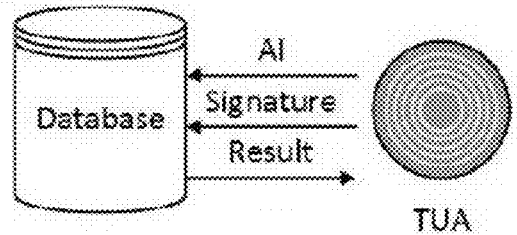

In an embodiment, each UCR tag is stimulated with a source of radio frequency transmission comprising an ultra-wideband (UWB) plane wave (i.e., in the frequency range between about 3.1 and about 10.6 GHz). In some embodiments, the UCR tag could also be stimulated with a source of radio frequency transmission comprising a plane wave with a different frequency range (e.g., any subset of the range between about 1 MHz and about 20 GHz). As provided herein, the UWB signal is emitted by an RFID reader that is also capable of capturing a frequency response spectrum (i.e., the resonance frequency signature) similar to those depicted in FIGS. 5C and 5D. Upon stimulation, each slot resonator produces a fundamental resonance point in the frequency response spectrum provided by the RFID reader, and the measured resonance points are independent of one another.

In some embodiments, the UCR tags can also be read and its information captured by an electronic device equipped with hardware such as, for example, a UWB source, antenna, an analog front-end, and an analog-to-digital converter, as well as software for measuring frequency resonance spectrum and transmitting between and downloading from a centralized database any tag-related information. In an embodiment, the UCR tags can be read by cellular phones, hand-held scanners, smart watches, or smart bands equipped with the hardware and software components provide herein.

In an embodiment, the communication flow of a UCR tag authentication system comprises stimulation of the UCR tag with a UWB plane wave emitted by an RFID reader, determination of the unique signature identification and/or temperature information of the UCR tag, communication with the centralization database about the captured signature identification and/or temperature information, authentication of the UCR tag by the centralized database, and communication of the authentication results as well as other information including, for example, manufacturer, ingredients, product description, and expiration date, with the RFID reader (Table III). In an embodiment, the RFID reader is a smart cellular phone.

TABLE III

Database structure.

| DI | AI | Unique ID | Temp. Sign. | Product Info |
|---|---|---|---|---|
| i | $ED_{0,\,i}$ | $\vec{V}_i(f_1, f_2, \ldots, f_N)$ | $f_N^i + 1$ | 1. Manufacturer<br>2. Ingredients<br>3. Product description<br>4. Expiration date |

In some embodiments, intermittent RF interference experienced by the UCR tag and the look-up system thereof can be minimized by repeating the RF reading measurements.

Advantageously, the UCR tags provided herein yield secure means of identification without requiring complex processing procedures (e.g., removing or shorting some of the resonators located on the tag) to encode data. They are also intrinsically resistant to the denial-of-service attack performed in the form of overwriting tag memory since tag memory has been eliminated from the UCR tags provided herein. Furthermore, compared with prior-art technologies in which exhaustive search is required during authentication phase, methods of embodiments of the subject invention can speed up the look-up process, significantly reducing the manufacturing time and cost associated with the track-and-trace applications.

The subject invention includes, but is not limited to, the following exemplified embodiments.

Embodiment 1. A chipless radio-frequency identification (RFID) tag for tracking a product, the chipless RFID tag comprising:
a first substrate;
a plurality of slot resonators fabricated on the first substrate, wherein each slot resonator has a characteristic resonance frequency value that randomly deviates from a theoretical resonance frequency value determined by a geometric dimension and a material property of both the slot resonators and the first substrate,
wherein a resonance frequency signature of the tag is a collection of each of the plurality of slot resonators' characteristic resonance frequency value, and
wherein the tag is integrated with, attached to, or printed on the product or a package thereof.

Embodiment 2. The tag according to embodiment 1, wherein the plurality of slot resonators are conductive.

Embodiment 3. The tag according to any of embodiments 1-2, wherein the plurality of slot resonators are I-shaped, U-shaped, C-shaped, split square-shaped, or circular ring-shaped.

Embodiment 4. The tag according to any of embodiments 1-2, wherein the plurality of slot resonators are circular ring-shaped.

Embodiment 5. The tag according to embodiment 4, wherein the plurality of slot resonators are arranged in a concentric configuration.

Embodiment 6. The tag according to any of embodiments 1-5, wherein the plurality of slot resonators comprise materials selected from elemental and alloyed metals, polymers, conductive ink particles, and nanoparticles.

Embodiment 7. The tag according to any of embodiments 1-6, wherein the first substrate comprises one or more materials having a dielectric constant in the range of 2-10.

Embodiment 8. The tag according to any of embodiments 1-7, wherein the first substrate comprises a ceramic-polymer composite, wherein a surface of the first substrate in contact with the plurality of resonators is covered with a layer of metallic material.

Embodiment 9. The tag according to any of embodiments 1-8, wherein the first substrate comprises glass-reinforced poly(tetrafluoroethylene) (PTFE) covered with a layer of copper.

Embodiment 10. The tag according to any of embodiments 1-9, wherein the resonance frequency signature of the tag is unclonable.

Embodiment 11. The tag according to any of embodiments 1-10, further comprising:
a second substrate different from the first substrate;
a standalone slot resonator fabricated on the second substrate; and
a plurality of metallic particles embedded within the second substrate and having a defined melting temperature above which the metallic particles are free to move to a surface of the second substrate different from a location of the standalone slot resonator.

Embodiment 12. The tag according to embodiment 11, wherein the standalone slot resonator comprises the same material as, and has the same shape as, each of the plurality of slot resonators fabricated on the first substrate.

Embodiment 13. The tag according to embodiment 11, wherein the standalone slot resonator comprises a different material from, and has a different shape from, each of the plurality of slot resonators fabricated on the first substrate.

Embodiment 14. The tag according to any of embodiments 11-13, wherein the free movement of the metallic particles causes a shift in a resonance frequency of the standalone slot resonator.

Embodiment 15. The tag according to any of embodiments 11-14, wherein the second substrate comprises a material selected from grease and wax.

Embodiment 16. The tag according to any of embodiments 11-15, wherein the metallic particles are copper particles with a diameter ranging from 0.2 mm to 2.0 mm.

Embodiment 17. The tag according to any of embodiments 1-16, wherein the tag is integrated with a printed circuit board (PCB).

Embodiment 18. A method of enrolling a target chipless radio-frequency identification (RFID) tag in a centralized database, the method comprising:

providing the target chipless RFID tag, wherein the target tag comprises a plurality of slot resonators fabricated on a substrate, wherein each slot resonator has a characteristic resonance frequency value that randomly deviates from a theoretical resonance frequency value determined by a geometric dimension and a material property of both the slot resonators and the substrate, wherein a resonance frequency signature of the tag is a collection of each of the plurality of slot resonators' characteristic resonance frequency value;

determining a theoretical resonance frequency signature $\vec{v}_0$ of the target tag;

scanning the target tag with a radio frequency (RF) signal;

determining a characteristic resonance frequency signature $\vec{v}_i$ of the tar et tag;

calculating the Euclidean distance $ED_0,i$ between $\vec{v}_0$ and $\vec{v}_i$; and storing $ED_0,i$ as an analog index of the target tag in the centralized database, wherein i denotes a digital index assigned to the target tag.

Embodiment 19. The method according to embodiment 18, wherein the target tag is integrated with, attached to, or printed on a product or a package thereof.

Embodiment 20. The method according to any of embodiments 18-19, wherein the target tag includes any or all of the features listed in any of embodiments 1-17.

Embodiment 21. A method of verifying the existence of a target chipless radio-frequency identification (RFID) tag in a centralized database, the method comprising:

providing the target chipless RFID, wherein the target tag comprises a plurality of slot resonators fabricated on a substrate, wherein each slot resonator has a characteristic resonance frequency value that randomly deviates from a theoretical resonance frequency value determined by a geometric dimension and a material property of both the slot resonators and the substrate, wherein a resonance frequency signature of the tag is a collection of each of the plurality of slot resonator' characteristic resonance frequency value;

scanning the target tag with an RF signal; $\vec{v}_{TUA}$ determining a characteristic resonance frequency signature $\vec{v}_{TUA}$ of the target tag;

calculating the Euclidean distance $ED_{0,TUA}$ between a theoretical resonance frequency signature $\vec{v}_0$ and $\vec{v}_{TUA}$; and verifying whether $ED_{0,TUA}$ exists in the centralized database.

Embodiment 22. The method according to embodiment 21, wherein the target tag is integrated with, attached to, or printed on a product or a package thereof.

Embodiment 23. The method according to any of embodiments 21-22, wherein the target tag includes any or all of the features recited in any of claims 1-17.

Embodiment 24. A chipless radio-frequency identification (RFID) tag, comprising:

a substrate;

a standalone ring slot resonator disposed on the substrate; and a plurality of metallic particles embedded in the substrate, wherein the substrate is configured to allow the plurality of metallic particles to move according to a temperature transition.

Embodiment 25. The RFID tag according to embodiment 24, wherein the substrate includes at least one of ice, grease, and wax.

Embodiment 26. The RFID tag according to any of embodiments 24-25, wherein a relative permittivity of the plurality of metallic particles is larger than that of the substrate.

Embodiment 27. The RFID tag according to any of embodiments 24-26, wherein the plurality of metallic particles includes at least one of copper, steel, and aluminum.

Embodiment 28. The RFID tag according to any of embodiments 24-27, wherein the substrate includes a first layer disposed on a bottom surface of the standalone ring slot resonator and a second layer disposed on a bottom surface of the first layer, and the plurality of metallic particles are embedded in the second layer.

Embodiment 29. The RFID tag according to any of embodiments 24-28, wherein the standalone ring slot resonator is made of a copper.

EXAMPLES

A greater understanding of the present invention and of its many advantages may be had from the following example, given by way of illustration. The following example is illustrative of some of the methods, applications, embodiments, and variants of the present invention. It is, of course, not to be considered as limiting the invention. Numerous changes and modifications can be made with respect to the invention.

Example 1

Factors Affecting Sensitivity of a Slot Resonator's Notch Frequency

Figures 2A, 2B, 2C:
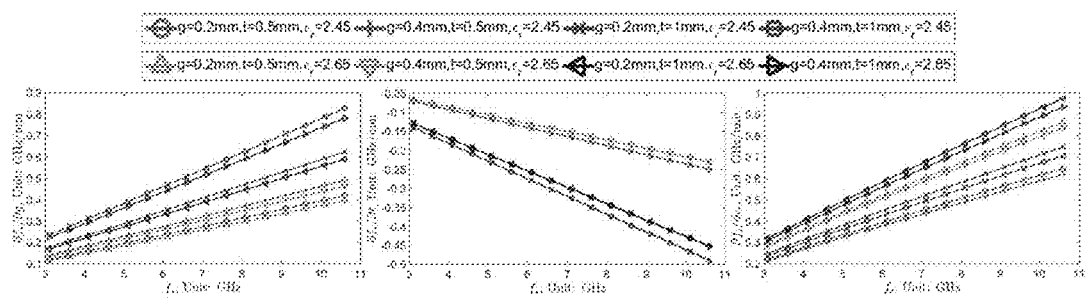
FIGS. 2A-2C demonstrate sensitivity of notch frequency to various slot parameters at different frequencies.

FIGS. 2A-2C demonstrate the theoretically computed sensitivity of notch frequency to variances in slot parameters at different frequencies. The analysis was limited to UWB with a frequency range between about 3.1 GHz and about 10.6 GHz. Sensitivity of notch frequency to air gap, substrate thickness, and substrate' relative permittivity (i.e., dielectric constant) are represented by $$\frac{\partial f_s}{\partial g}, \frac{\partial f_s}{\partial t}, \text{ and } \frac{\partial f_s}{\partial \varepsilon_r},$$

respectively. All three sensitivity values appear linear to the variance of notch frequency in the tested frequency range of UWB.

It was also observed that air gap had little impact on the sensitivity of notch frequency to variance in substrate thickness. In FIG. 2B, for example, curves with identical substrate thickness and relative permittivity but different air gaps are overlapping with each other.

Example 2

Slot and Substrate Parameters

Table I illustrates the manufacturing tolerances of five major printed circuit board (PCB) manufacturers in the United States. For the trace width and air gap, the maximum deviation between design value and measured value can be as large as 20%. PCB thickness will typically have a tolerance of 10%.

TABLE I

PCB manufacturing tolerances

| PCB Manufacturer | Trace Width/Air Gap Tolerance | PCB Thickness Tolerance |
|---|---|---|
| Advanced Circuits | max(+/−20%, +/−0.002") | max(+/−10%, +/−0.005") |
| Sunstone | +/−20% | +/−10% |
| Sierra Circuits | +/−0.001" | +/−10% |
| Precision PCBS | +/−20% | +/−0.005" |
| RUSH PCB | +/−0.005" | +/−10% |

Table II shows the tolerances in dielectric constant ($\varepsilon_r$) of six typical high-frequency substrate laminates. The tolerances can range from 1.33% to 3.49%. According to Equations 7, 8, and 9, as well as FIGS. 2A-2C, the resonance frequency of each slot resonator will shift away from its design. Because of the randomness of process variation, the frequency signature of each UCR tag is unique and different from each other. The vector $(f_1, f_2, \ldots, f_N)$ is used as the identifier of each tag, where $f_1$ indicates the resonance frequency of the $i_{th}$ slot resonator.

For a UCR tag with 10 slot resonators, for example, the diameter of the tag is approximately 20 mm, which is similar to the dimension of a QR code. As suggested by FIGS. 5A-5D, the central circular pad should be removed from the UCR tag; otherwise, the last resonance point will shift away from the other resonance points to possibly outside the UWB frequency range. Furthermore, with the central pad filled, the valley point of the spectrum may be flattened, reducing the accuracy of the frequency measurement.

TABLE II

PCB laminate $\varepsilon_r$ tolerances

| Supplier | Laminate | $\varepsilon_r$ | $\varepsilon_r$ Tolerance |
|---|---|---|---|
| TACONIC | RF-30 | 3.00 | +/−0.10 |
| TACONIC | TRF-43 | 4.30 | +/−0.15 |
| TACONIC | TLX-0 | 2.45 | +/−0.04 |
| ROGERS | RO3003 | 3.00 | +/−0.04 |
| ROGERS | RO4350B | 3.48 | +/−0.05 |
| ROGERS | RT/Duroid 6006 | 6.15 | +/−0.15 |

Example 3

Method of Verification of a UCR Tag

Because of noise interference and angle variation of the incident plane wave, the signature captured from the same tag may be slightly different at different times. Euclidean distance between two vectors $\vec{v}_i^j = (f_1^j, f_2^j, \ldots, f_N^j)$ and $\vec{v}_i^k = (f_1^k, f_2^k, \ldots, f_N^k)$ was thus used to determine whether these two vectors belong to the same tag, where $\vec{v}_i^j$ and $\vec{v}_i^k$ denote the signature of the $i_{th}$ tag obtained at times j and k, respectively. The Euclidean distance (ED) between and $\vec{v}_i^j$ and $\vec{v}_i^k$ can be computed as follows:

$$ED_i^{j,k} = |\vec{v}_i^j - \vec{v}_i^k| = \sqrt{\sum_{r=1}^{N} (f_r^j - f_r^k)^2} \quad (15)$$

Two signatures are determined to belong to the same tag if their Euclidean distance is not larger than the maximum intra-tag Euclidean distance obtained at the enrollment phase.

Example 4

A Model for Evaluating the Efficacy of UCR Tags

CST Microwave Studio 2015 was used as a simulation platform. FIGS. 11A-11C illustrate the simulation setup. In the present example, the UCR tag comprises 10 concentric ring slot resonators placed on a TACONIC TLX-0 substrate. The metallic pattern comprises pure copper. Circularly polarized plane wave was used to stimulate the UCR tag. The radio cross-section (RCS) probe was placed 50 mm away from the tag to detect backscattered signal. Table IV summarizes these simulation parameters. The air gaps, as well as the thickness and dielectric constant of the substrate material conform to normal distributions with design values as the mean values and tolerances as three times of the standard deviations. The frequency band used by UCR tags ranged from about 4 GHz to about 10 GHz.

TABLE IV

Simulation parameters. N(μ, σ) represents a normal distribution.

| Variable | Parameter | Value |
|---|---|---|
| $sub_d$ | Substrate diameter | 20 mm |
| t | Substrate thickness | N(0.5 mm, 0.0423 mm) |
| $\varepsilon_r$ | Substrate dielectric constant | N(2.45, 0.0133) |
| $patch_d$ | Patch diameter | 18 mm |
| h | Patch thickness | 0.035 mm |
| $void_d$ | Central void diameter | 7.4 mm |
| $g_i$ | Air gap i (i = 1, . . . , 10) | N(0.2 mm, 0.0169 mm) |

Example 5

Evaluation of the Uniqueness of the UCR Tags

In order to verify the uniqueness of each UCR tag provided herein, 100 samples with constraints listed in Table IV were generated using pseudo random number generators. Table V shows the statistic standard deviation (std($f_i$)) of each resonance frequency ($f_i$) of these samples. Standard deviation (std($f_i$)) normalized by the mean value (std($f_i$)/mean($f_i$)) for each resonance frequency is also illustrated.

It was observed that the standard deviations of resonance frequencies are large enough to differentiate each UCR tag. FIG. 12A illustrates the Euclidean distance distribution of the UCR tags. The minimum, mean, and maximum Euclidean distance for the 100 samples was 33.2039 MHz, 180.9612 MHz, and 587.0043 MHz, respectively.

Simulation results demonstrated that the Euclidean distances computed using methods provided herein are effective in differentiating different UCR tags.

TABLE V

Standard deviations of resonance frequencies.

| | $f_1$ | $f_2$ | $f_3$ | $f_4$ | $f_5$ | $f_6$ | $f_7$ | $f_8$ | $f_9$ | $f_{10}$ |
|---|---|---|---|---|---|---|---|---|---|---|
| std($f_i$) (MHz) | 23.6045 | 24.1153 | 29.8766 | 35.0085 | 31.5511 | 43.8437 | 40.3017 | 53.3831 | 65.8381 | 72.7412 |
| std($f_i$)/mean($f_i$) | 0.0056 | 0.0053 | 0.0061 | 0.0066 | 0.0056 | 0.0071 | 0.0059 | 0.0071 | 0.0080 | 0.0078 |

Example 6

Evaluation of the Reliability of the UCR Tags

The reliability of UCR tags Against environmental noise and varying angles of incident plane wave was evaluated. 10 UCR tags were measured 10 times under different conditions. FIG. 12B illustrates the inter-tag and intra-tag Euclidean distance distributions of the UCR tags in the presence of random WGN with a SNR of 10 dB, though 20 dB is usually recommended as the minimum SNR for a good RF deployment of the wireless local area network (WLAN) [22].

The margin between the minimum inter-tag Euclidean distance and the maximum intra-tag Euclidean distance reached approximately 50 MHz. FIG. 12C illustrates the Euclidean distances relative to zero incident angle for 10 tags when angle of incidence varied from 5° to 30°. The larger the angle of incidence is, the larger the Euclidean distance relative to zero incident angle will be. FIG. 12D shows the inter-tag and intra-tag Euclidean distance distributions of the UCR tags when the angle of incident plane wave varied from 0° to 20°. The margin between the minimum inter-tag Euclidean distance and the maximum intra-tag Euclidean distance reached approximately 20 MHz.

In order to achieve high accuracy of tag authentication, variance in the angle of incident plane wave should not exceed 20°. When considering the environmental noise and varying angles of incident plane wave, the inter-tag Euclidean distance distributions of the UCR tags are slightly different from those presented in FIG. 12A, in which the inter-tag Euclidean distance distribution was obtained in an ideal condition.

Evaluation

In this section, the experimental setup and results are provided. Simulation results based on CST Microwave Studio 2015 were presented in an earlier version of this article [28]. Here, the performance of manufactured UCR tags in terms of uniqueness and reliability are evaluated. How to increase the detection accuracy using machine learning algorithms is also discussed. Afterwards, the resilience of UCR system to the potential attacks is analyzed. Last, an embodiment of a UCR system is compared with the state-of-the-art techniques.

Experimental Setup Agilent E8361A programmable network analyzer (PNA) is used to measure the insertion loss (S21) of each UCR tag. FIG. 14(a) illustrates the experimental setup. One UWB PCB antenna connected to port I of network analyzer will work as the transmitter and be responsible for stimulating the UCR tag with an UWB plane wave. Another UWB PCB antenna connected to port II of network analyzer will work as the receiver and be responsible for capturing the frequency response spectrum of UCR tag. The distance between the transmitter and the receiver is set to 10 cm. The UCR tag is attached to a pharmaceutical package, which is placed in between the transmitter and the receiver, to mimic the real scenario. The Barnstead Thermolyne hotplate, as shown in FIG. 14(b), is used to heat UCR part II and melt its substrate (butter in the prototype). FIG. 14(c) and FIG. 14(d), respectively, illustrate the prototypes of UCR part I and II. UCR part I comprises 10 concentric ring slot resonators integrated on the TACONIC TLX-0 laminate. The metallic pattern is made of pure copper. The layout of UCR part I is shown in FIG. 15(a). Table 1 lists its design parameters. UCR part II is a standalone circular ring slot resonator placed on two layers of substrates. The first layer of substrate is also made of TACONIC TLX-0 and its thickness is set to 0.254 mm (the thinnest available thickness). The second layer of substrate is made of butter with 25 copper balls filled in. The butter is packaged with glass plates. The layout of UCR part II is shown in FIG. 15(b). Table 2 lists its design parameters. The frequency band used by UCR tags ranges from 4 GHz to 10 GHz.

TABLE 1

Design parameters for UCR part I.

| Variable | Parameter | Value |
|---|---|---|
| sub_$d_1$ | Substrate diameter | 20 mm |
| $t_1$ | Substrate thickness | 0.5 mm |
| $\varepsilon_r$ | Substrate dielectric constant | 2.45 |
| patch_$d_1$ | Patch diameter | 18 mm |
| $h_1$ | Patch thickness | 0.035 mm |
| void_$d_1$ | Central void diameter | 7.4 mm |
| $g_{1i}$ | Air gap i (i = 1, . . . , 10) | 0.2 mm |

Performance Evaluation of UCR Part I

Figures 16A, 16B:
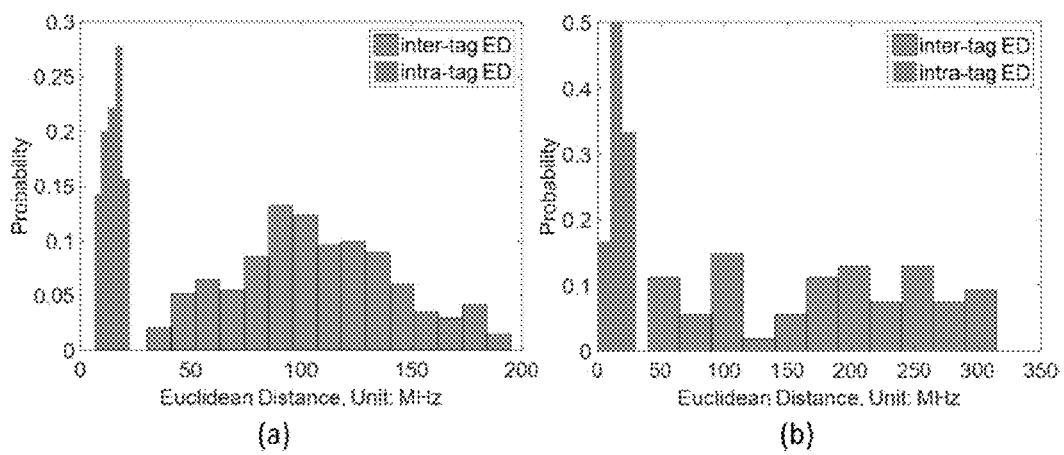
FIG. 16A shows Euclidean distance distributions of UCR tags in the presence of environmental noise.
FIG. 16B shows Euclidean distance distributions of UCR tags when angle of incidence varies from 00 to 15°.
Figure 17:
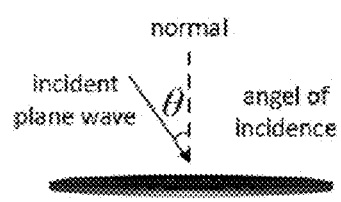
FIG. 17 shows an angle of incidence.

Euclidean Distance Based Tag Recognition. In this subsection, the effectiveness of Euclidean distance based tag recognition in the presence of environmental noise and with varying angles of incident plane wave is analyzed. Fourteen UCR tags were measured 5 times at different conditions. FIG. 16(a) illustrates the inter-tag and intra-tag Euclidean distance distributions of UCR tags in the presence of environmental noise. The margin between minimum inter-tag Euclidean distance and maximum intra-tag Euclidean distance reaches approximately 13.102 MHz. FIG. 16(b) shows the inter-tag and intra-tag Euclidean distance distributions of UCR tags when the angle of incident plane wave (see FIG. 17) varies from 0° to 15°. The margin between minimum inter-tag Euclidean distance and maximum intra-tag Euclidean distance reaches approximately 20.879 MHz. In order to achieve high accuracy of tag recognition, the varying angle of incident plane wave should be not larger than 15°. Experimental result demonstrates that the Euclidean distances between signatures of UCR tags are effective at differentiating each other.

TABLE 2

Design parameters for UCR part II.

| Variable | Parameter | Value |
| --- | --- | --- |
| $sub\_d_2$ | Substrate diameter | 20 mm |
| $t_{21}$ | Substrate I thickness | 0.254 mm |
| $t_{22}$ | Substrate II thickness | 5 mm |
| $\varepsilon_r$ | Substrate dielectric constant | 2.45 |
| $patch\_d_2$ | Patch diameter | 19 mm |
| $h_2$ | Patch thickness | 0.035 mm |
| $slot\_d_2$ | Slot diameter | 14 mm |
| $g_2$ | Air gap | 0.5 mm |
| $ball\_d$ | Copper ball diameter | 2 mm |

In this subsection, the effectiveness of machine learning based tag recognition is analyzed. Supervised machine learning techniques are utilized to maximize the accuracy of tag recognition. Specifically, linear discriminant analysis (LDA) [24] is chosen due to its ability to focus on the most discriminating features between classes as opposed to the most expressive ones. Prior to any implementation it is important to first apply some pre-processing to the signals. In practice various noise sources may affect the locations of resonance points of UCR tags. Since these resonance points are frequency-domain characteristics, signal smoothing via a moving average filter is the best approach to ensure a quality signal spectrum that can be used for classification.

To continue, performing LDA on the sampled data requires a large amount of computations due to the high dimensionality of the signal. In order to solve this problem, principal component analysis (PCA) [26] is used not only to reduce dimensionality but also as a means of further noise removal. When applying PCA, the principal components were chosen in a manner to ensure that at least 95% of the total variance of the signal was maintained after projection to the new reduced dimensional space. Additionally, both PCA and LDA processes were holistically evaluated through cross-validation. The parameters that were cross-validated were the amount of data used for calculating the principal components and training the classifier, as well as the different combinations of the training sets that were used since some combinations of data sets may outperform others.

In particular, during the experimentation process there were multiple measurements gathered for different sets of tags and based on the amount of measurements the data was partitioned differently for training. For example, when 5 tags were measured 15 separate times the partitioning for PCA cross-validation was using 4 sets, 8 sets, and 15 sets of measurements for the 5 tags in different sequential combinations for computing the principal components for projection. For instance, in the case of 4 sets, the combinations tested for PCA were sets 1-4, 2-5, 3-6, etc.

Then the projected data was used to train the LDA classifier by using partitions of 2 data sets(1-2, 2-3, etc.), 4 data sets(1-4, 2-5, etc.), 8 data sets(1-8, etc.) and 12 data sets. This results in 14, 12, 8, and 4 sets of test data that the classifier was not trained on for evaluating the classifier's performance. Additionally, this cross-validation process was applied to tags with sampling frequencies of 400, 12800, and 16000 samples per signal. This not only offers understanding about which grouping of parameters may be optimal for training but also provides insight into the effects sampling resolution may have on classification performance.

Figure 18A:
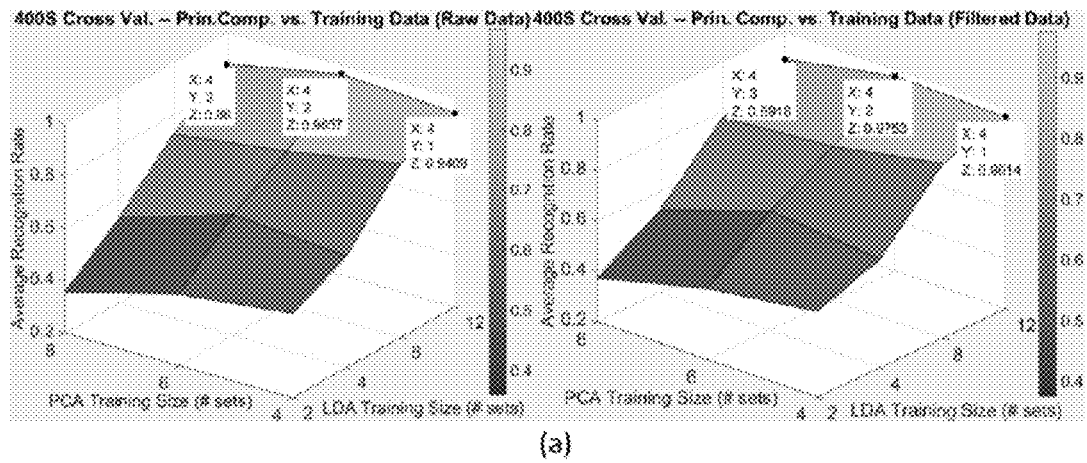
FIG. 18A shows overall recognition performance for (5T, 15M, 400S).
Figure 18B:
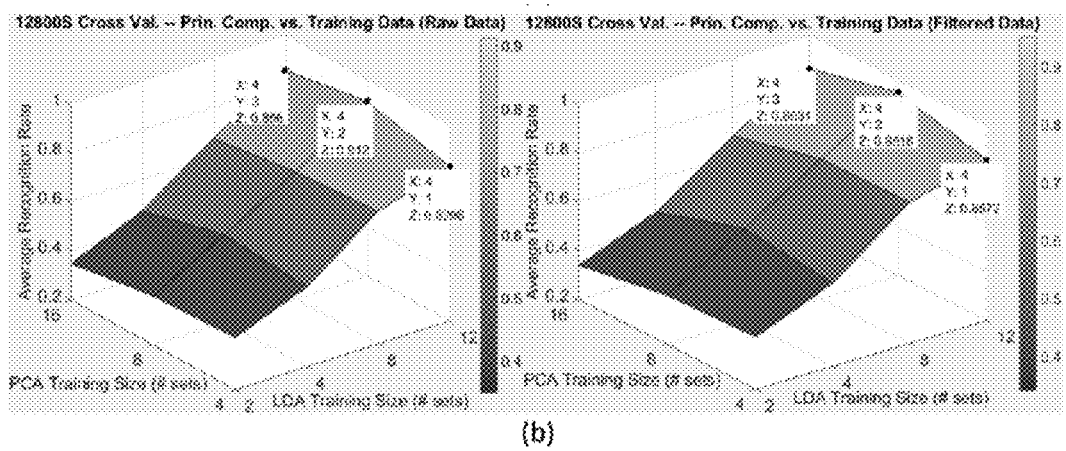
FIG. 18B shows overall recognition performance for (5T, 15M, 12800s).
Figure 18C:
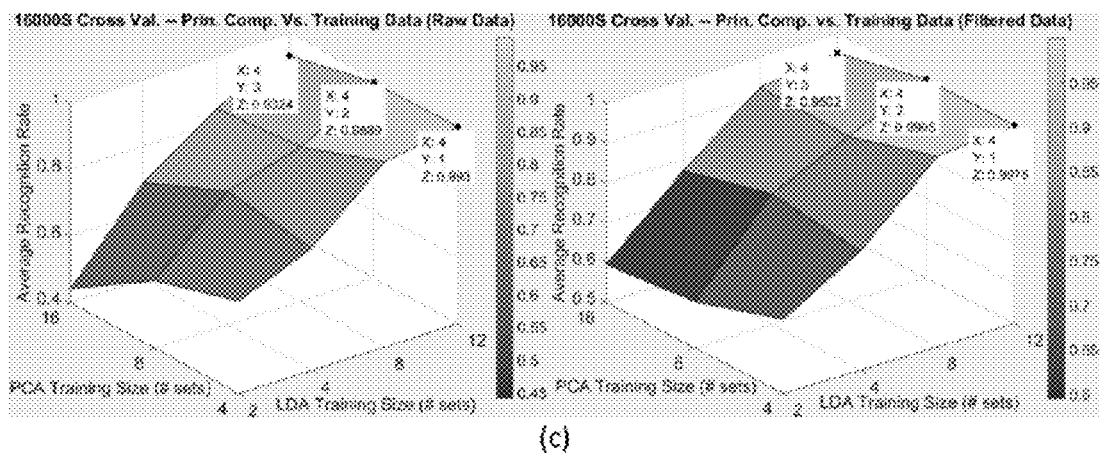
FIG. 18C shows overall recognition performance for (5T, 15M, 16000S).

FIGS. 18(a), (b), and (c) show the mean recognition rate across all the various combinations of this process for 5 tags-15 measurements-400/12800/16000 sample points per signal respectively, where the triple (x T, yM, zS) represents the data set of x tags-y measurements for each tag-z sampling points for each measurement, as well as comparing the classification performance between the raw and filtered signals. As can be observed from the figures, the mean recognition rate seems best when performing PCA on just 8 sets of the data and training the LDA classifier on 12 sets of the data. In most cases the worst results occurred when using all of the data for computing the principal components. These results make sense because PCA in some cases may be influenced by outliers so by computing the principal components on too much data it can make the projection a little inaccurate. And for training LDA the more data the classifier can be trained on the better the result would be, since it will be able to further maximize the inter-variance between tag classes and minimize the intra-variance in tag classes. Additionally, it appears that the filtered signals do classify better but only marginally when compared to the raw signals. This speaks to the power that using the classification technique adds for this application since it appears to be more robust in classification than unsupervised learning techniques. Furthermore, based on the results in the plots it appears that this classification approach is not too sensitive to the sampling resolution during signal acquisition.

Next, the classification performance for the tags sampled with a resolution of 400 and 12800 sample points is explored further for the same amount of measurement sessions but now with more tags to compare how this classification process scales up. This increase in the amount of tags that are measured provides more data for the algorithm to classify and evaluate its performance based on the cross-validated parameters.

Figure 19A:
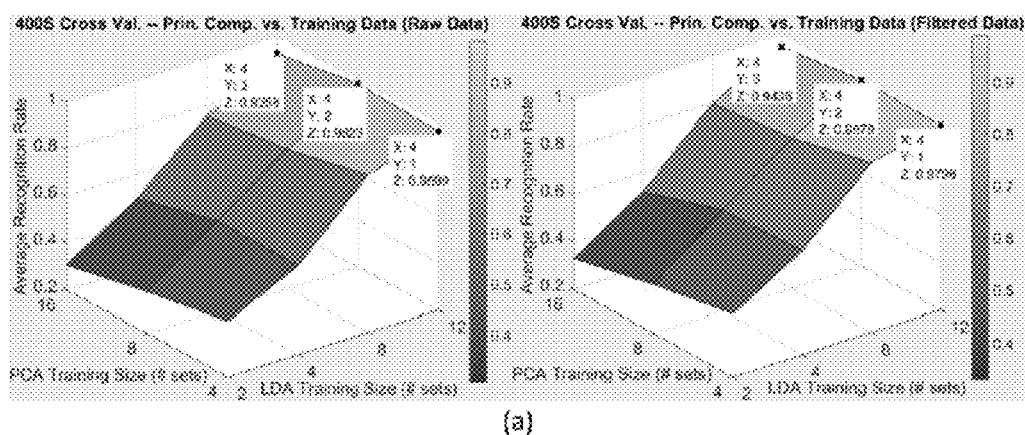
FIG. 19A shows overall recognition performance for (10T, 15M, 400S).
Figure 19B:
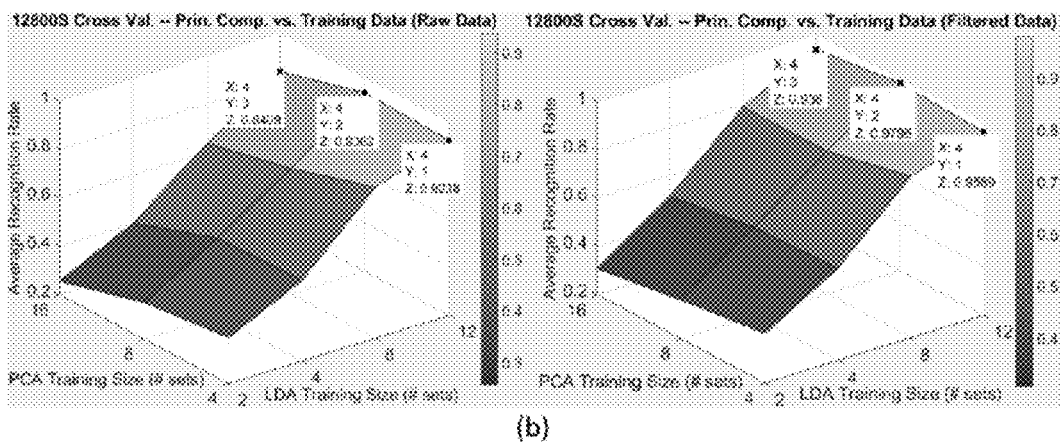
FIG. 19B shows overall recognition performance for (10T, 15M, 12800S).

Again, the LDA classifier will go through the same cross-validation process as the previous experiments but for classification of 10 tags now as opposed to the 5 from beforehand. FIG. 19(a) shows the performance surface for the 10 tag/15 measurement/400 sample resolution cross-validation results and FIG. 19(b) shows the results for the 10 tag/15 measurement/12800 sample resolution experiment. As can be seen from the plots the recognition performance for both the raw and filtered signals maintains the same trend in optimal parameters for the 10 tags as it did when being evaluated for 5 tags. Once again the optimal performance occurred when PCA is applied on 8 sets of the data and trained on 12 sets of the data. This provided top recognition scores of 98.23% and 98.78% for the raw and filtered 400-sample signals respectively, and 93.62% and 98.23% for the raw and filtered 12800-sample signals. Additionally, comparing the results between the 5- and 10-tag experiments actually shows an increase in the recognition accuracy for the different cross-validated parameters. Specifically, Table 3 displays this improvement for the LDA classifier trained on 12 sets of the data with different PCA training partitions. This demonstrates that the not only accurately classifies tags but can maintain or even improve accuracy as the scale of the amount of tags increases.

TABLE 3

Recognition performance comparison among different PCA training partitions

| Sampling resolution | Training size | Raw score | | Filtered score | |
| --- | --- | --- | --- | --- | --- |
| | | 5 tags | 10 tags | 5 tags | 10 tags |
| 400 | 4 | 88% | 92.58% | 89.16% | 94.36% |
| 400 | 8 | 96.57% | 98.23% | 97.53% | 98.78% |
| 400 | 15 | 94.09% | 95.99% | 96.14% | 97.96% |

TABLE 3-continued

Recognition performance comparison among different PCA training partitions

| Sampling resolution | Training size | Raw score | | Filtered score | |
|---|---|---|---|---|---|
| | | 5 tags | 10 tags | 5 tags | 10 tags |
| 128000 | 4 | 85.6% | 84.09% | 86.31% | 94.18% |
| 128000 | 8 | 91.2% | 93.62% | 95.16% | 98.33% |
| 128000 | 15 | 82.96% | 92.238% | 85.72% | 96.1% |

Figure 20:
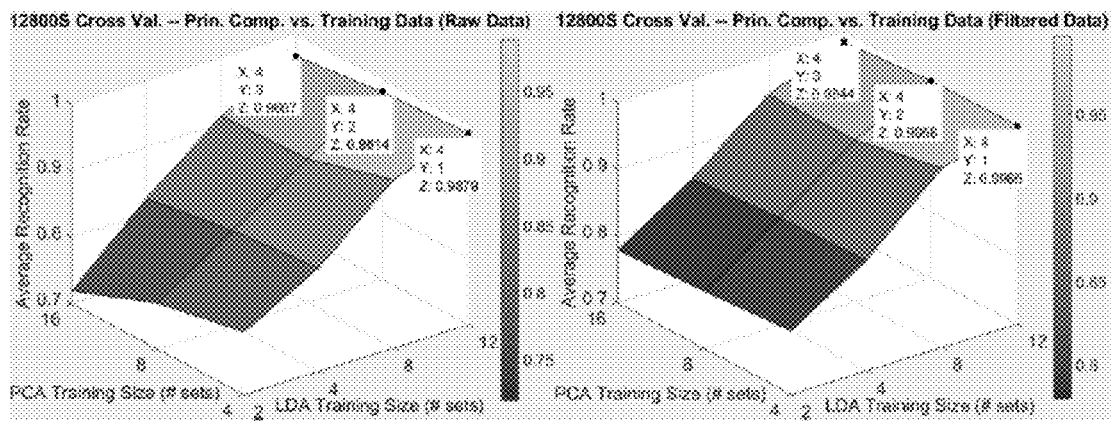
FIG. 20 shows overall recognition performance for (30T, 15M, 12800S).

However, while these results show that the recognition performance scales for relatively small sample sets of tags, to truly gauge the uniqueness of UCR tags it is important to evaluate a larger dataset. FIG. 20 shows the overall recognition performance for 30 tags. Each tag was measured 15 times with 12800 sampling points. It is observed that the recognition performance maintains for a larger dataset. Top performing partitions for both raw and filtered datasets reach a recognition rate close to 100%. The lowest recognition rates for the raw and filtered datasets are 96.67% and 98.44% on average of all the different partitions and combinations.

Figure 21A:
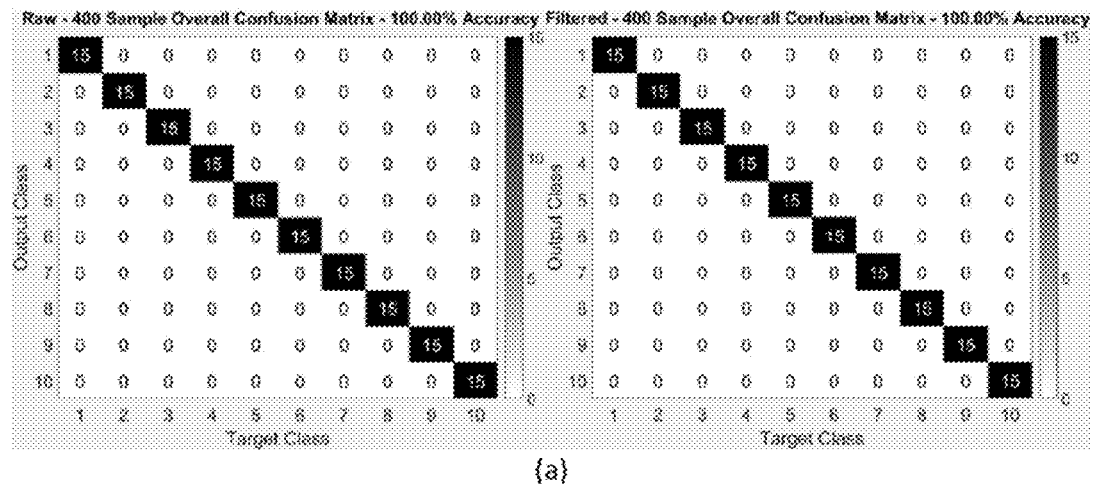
FIG. 21A shows an overall confusion matrix for (10T, 15M, 400S).
Figure 21B:
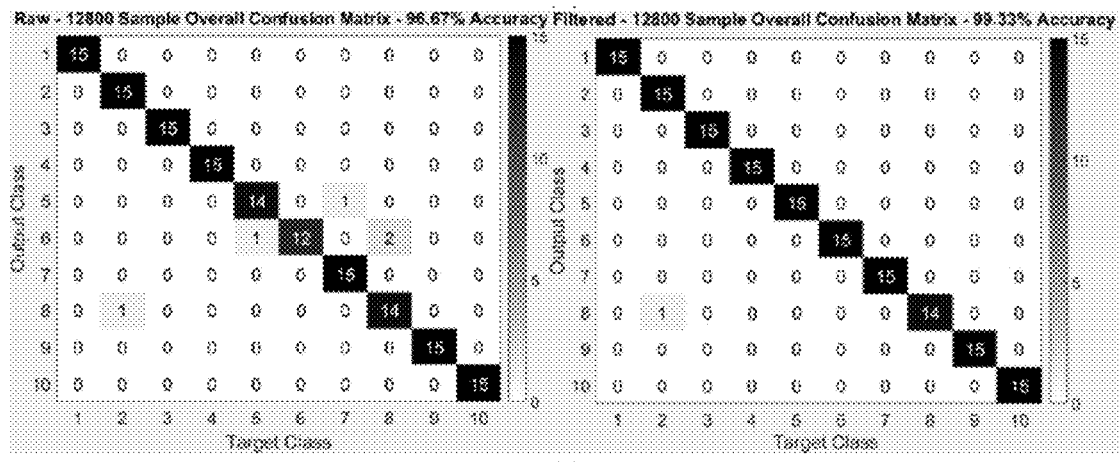
FIG. 21B shows an overall confusion matrix for (10T, 15M, 12800S).

To further solidify these results the optimal parameters for cross-validation were tested by being applied to the 400-sampling-point and 12800-sampling-point data sets but with a random starting partition for training. This illustrates the effectiveness of using these parameters for training the classifier since the previous results were the mean performance for combinations of different datasets. The random starting location should show that no matter what data the algorithm uses for training, the performance should be consistent with the results from cross-validation as long as enough variance of tag spectrum is represented in the data. FIG. 21(a) and FIG. 21(b) are the confusion matrices that display the classification results for the 10 tag-15 measurement-400/12800 sampling point experiments for a random starting location for training. As can be seen from the plots there were no misclassifications for the 400-sampling-point signals and only 6 misclassifications for the 12800-sampling-point signal (5-raw and 1-filtered). These results further reinforce the optimal parameters for cross-validation of 8 data sets for PCA training and 12 data sets for LDA training and the effectiveness of the supervised learning technique for classifying these UCR tags.

While this supervised classification method works very well for raw and filtered signals, as well as tags measured at different angles, the computational complexity required to compute the classifier can quickly increase in terms of scale depending on the number of tags that need to be enrolled in the database. Therefore, it is important to also look at various unsupervised methods of classification (i.e., non-machine learning based methods) that can effectively complete the same desired task. The resonance points of each tag are the designed discriminant features that are unique to each tag so naturally these features should be used as the feature vectors for each tag. For these experiments the resonance points were located using a valley detection algorithm in the bandwidth of 4.1 GHz to 9.4 GHz since this is the bandwidth of interest for the resonance points. However, since the valley detection technique relies on the detection of local minima the raw signal must be effectively pre-processed first to ensure the proper location of the resonance points as local minima and minimize any false minima detection. The pre-processing consists of the smoothing used during the supervised learning process. The optimal window size for searching for a resonance point was empirically determined to be 5 times the length of the window used in the moving average filter during pre-processing. After the resonance points have been located, classification will simply depend on computing the distance/similarity between tag measurements and selecting the smallest similarity score depending on the technique used.

TABLE 4

Unsupervised recognition performance comparison for (20T, 30M, 12800S)

| Classification Technique | Recognition Rate |
|---|---|
| Euclidean Distance | 92.12% |
| Normalized Correlation | 91.97% |
| Lorentzian Distance | 91.33% |
| Manhattan Distance | 96.06% |
| Dynamic Time Warping | 100% |
| Wavelet Transform Manhattan Distance | 100% |

To effectively evaluate the performance of unsupervised classification, multiple distance measures were used, including Euclidean, Manhattan, Lorentzian, and the normalized correlation coefficient. Furthermore, unsupervised classification that does not require explicitly locating resonance points was explored as well by using techniques such as dynamic time warping [27] and computing the Manhattan distance between two tag measurements after performing wavelet transformation [23] and comparing the resultant coefficients. Dynamic time warping is useful for classification in this regard because although the embodiment may be dealing with signals in frequency domain instead of time domain, the features of interest are the locations of the resonance points and a similarity comparison between vectors can be done effectively using this technique. It effectively uses the resonance points as the features of interest without the need to explicitly search for them prior to classification. The specific wavelet chosen for classification was the Haar wavelet since it is adept at detecting abrupt discontinuities in a spectrum. After obtaining the wavelet transform coefficients of two tag measurements, the Manhattan distance between tags' wavelet coefficients was computed and resulted in an 8×8 matrix and the sum of the diagonals across this matrix was used to determine similarity between tag measurements. The minimum diagonal distance sum was determined to effectively represent the correct tag identification. Table 4 compares different unsupervised methods in terms of recognition performance for (20T, 30M, 12800S). Similar to the cross-validation process used in training the linear discriminant classifier, the tags were evaluated by selecting a group of tags from a set of measurements to serve as the gallery (enrolled) set and then use the remaining tags to serve as the probe (verification) sets. The performance is evaluated holistically so each measurement group serves as a gallery at least once and as probes the rest of the time.

As shown in Table 4, a maximum recognition rate of 100% was achieved for both the dynamic time warping and wavelet transform method. Dynamic time warping and wavelet transformation performed the best due to neither relying on the explicit locating of resonance points to use in the feature vector prior to classification. Since the other techniques do rely on this, there is room for inaccuracies during local minima detection that can lead to incorrect distance calculations and classification results. Additionally, these results are likely directly influenced by the fact that the original signals obtained in this dataset had minimal ambient noise interference and went through significant pre-processing. Therefore, these unsupervised methods of classification are comparable to the supervised LDA method when the measurement and processing conditions are almost optimal. However, it is also apparent that the supervised method is a more robust method since the average recognition rates of the raw signal data sets are often comparable to the filtered signal data sets by most times only a few percentage points.

To effectively evaluate the performance of these unsupervised classification techniques, they were applied to the tags measured at different angles of incidence. By evaluating the tag measurements with varying angles of incidence, it is observed that as long as the tag is enrolled at all proper angles, it can be accurately identified during the verification stage via a simple unsupervised classification niques and evaluation methods were used as the tags measured at the same angle earlier and the results are shown in Table 5.

TABLE 5

Unsupervised recognition performance comparison for (8T, 6A, 5M, 8000S)

| Classification Technique | Recognition Rate |
| --- | --- |
| Euclidean Distance | 97.33% |
| Normalized Correlation | 93% |
| Lorentzian Distance | 90.42% |
| Manhattan Distance | 98.75% |
| Dynamic Time Warping | 100% |
| Wavelet Transform Manhattan Distance | 99.92% |

The frequency spectrum of UCR tag is susceptible to the angle of incidence of plane wave. Naturally this could cause some issues in terms of classification since the tags are classified based on their respective spectra and locations of their resonance points. To ensure that the reliability of UCR tag is not vulnerable to variance of reading angle and that the classification algorithm is robust enough to handle this variance, 8 tags measured at 6 different angles of incidence (i.e., 0°, 5°, 10°, 15°, 20°, and 25°) were tested. Each tag was measured 5 times for each reading angle. Once again the same testing and cross-validation process was used to evaluate how truly robust the tags and classification algorithms were in terms of recognition but now the partitions used for training were 1 to 5 measurement sets for computing the principal components and 2 to 3 measurement sets for training the LDA classifier. For the raw dataset with varying angles of incidence, the lowest recognition score achieved was 76% when using 5 sets for PCA training and 2 sets for LDA training. The top performing recognition score for the raw datasets was 89.58% when using 1 set to train PCA classifier and 5 sets to train LDA classifier. The filtered dataset performed much better with a minimum average recognition rate of 99.25% and a maximum average recognition rate of 100% for the same partitions as the raw dataset. This shows that although variance of reading angle likely adds some noise to the captured frequency spectrum, proper pre-processing can help minimize its impact. Table 5 compares the recognition performance of different unsupervised classification techniques for the data set of 8 tags-6 reading angles for each tag-5 measurements for angle-8000 sampling points for each measurement. With all methods scoring above 90% recognition accuracy, this reinforces the ability to use these techniques for tag identification with decreased computational complexity. Although these scores outperformed the supervised classification of the raw signals, they were still on average lower than the worst performing filtered supervised classification results.

Performance Evaluation of UCR Part II

In this subsection, the performance of UCR part II in terms of tracking temperature is evaluated. 9 UCR tags were measured 10 times both before and after exposed to a high temperature. The Barnstead Thermolyne hotplate, as shown in FIG. 14(b), was used to heat UCR part II and melt its substrate (butter in our prototype). Table 6 shows the shifts of both first-order (1st-order) and second-order (2nd-order) resonance points. LT and HT respectively denote low temperature and high temperature. $f_1$ and $f_2$ respectively indicate 1st-order and 2nd-order resonance points. Mean(X) represents the mean value out of 10 measurements. $\Delta_1$ and $\Delta_2$ respectively indicate the shifts of 1st-order and 2nd-order resonance points after exposed to a high temperature.

TABLE 6

Resonance point shift after exposed to a high temperature.

| | LT | | HT | | | |
| --- | --- | --- | --- | --- | --- | --- |
| Tag | mean($f_1$)/GHz | mean($f_2$)/GHz | mean($f_1$)/GHz | mean($f_2$)/GHz | $\Delta_1$/MHz | $\Delta_2$/MHz |
| 1 | 4.2679 | 7.2113 | 4.4214 | 6.8083 | 153.4688 | −403.0313 |
| 2 | 4.2143 | 7.3680 | 4.3395 | 7.6635 | 125.1563 | 295.5 |
| 3 | 4.9313 | 6.7684 | 4.328 | 5.8983 | −603.2813 | −870.0938 |
| 4 | 4.2234 | 7.5563 | 4.4795 | 5.7199 | 256.125 | −1836.4 |
| 5 | 4.2557 | 7.3689 | 4.4087 | 5.9851 | 153 | −1383.8 |
| 6 | 4.2953 | 7.2675 | 4.451 | 7.1031 | 155.7188 | −164.3438 |
| 7 | 4.6707 | 7.2314 | 4.6118 | 7.6194 | −58.875 | 388.0313 |
| 8 | 4.408 | 7.0641 | 4.3737 | 7.4688 | 34.3125 | 404.625 |
| 9 | 4.4603 | 7.5044 | 4.4351 | 7.518 | −25.2188 | 13.5938 |

The first-order partial derivative of notch frequency with respect to dielectric constant of substrate material is larger than zero in the UWB, which means that the larger the dielectric constant of substrate material is, the larger the notch frequency will be. When the contrast ratio between the dielectric constants of the background and inclusions is small, the effective dielectric constant of the composite material depends on the volume fraction occupied by the inclusions and is not affected by the inhomogeneities distribution [25]. When this contrast ratio becomes large, the effective dielectric constant of the composite material would also depend on the component arrangement in space [25]. The dielectric constant of copper is 1. The dielectric constant of unsalted butter is 24.5 when measured at 30° C. and 2450 MHz [22]. Since the contrast ratio between the dielectric constants of butter and copper is very large (larger than 20), the effective dielectric constant of the substrate of UCR part II would be impacted by the spatial distribution of copper balls inside the butter. Since both before and after exposed to a high temperature, the positions of copper balls inside the butter are random. The effective dielectric constant of the substrate of UCR part II and thus its resonance frequency could become either larger or smaller after exposed to a high temperature. Experimental result demonstrates that UCR part II is effective at tracking temperature with memory.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] U.S. Department of Homeland Security. Intellectual Property Rights Seizures Statistics, Fiscal Year 2014, 2015.

[2] Sean Kilcarr. FreightWatch: Cargo theft risk will rise in 2015, March 2015. [3] Tricia Bishop and Baltimore Sun. UPC bar code has been in use 30 years/Once-controversial technology is now ubiquitous, July 2004.

[3] Yue Liu, Ju Yang, and Mongjum Liu. Recognition of QR Code with mobile phones. In Control and Decision Conference, 2008. CCDC 2008. Chinese, pages 203-206. IEEE, 2008.

[4] Yu Xiaoyang, Song Yang, Yu Yang, Yu Shuchun, Cheng Hao, and Guan Yanxia. An encryption method for QR code image based on ECA. Inter-national Journal of Security & Its Applications, 7(5), 2013.

[5] Suraj Kumar Sahu and Sandeep Kumar Gonnade. Encryption in QR Code Using Stegnography. IJERA International Journal of Engineering Research and Applications, 3(4), 2013.

[6] John Fredy Barrera, Alejandro Mira, and Roberto Torroba. Optical encryption and qr codes: Secure and noise-free information retrieval. Optics express, 21(5):5373-5378, 2013.

[7] Charles Wankel. 21st century management: a reference handbook. Sage Publications, 2007.

[8] Ce'dric Hocquet, Dina Kamel, Francesco Regazzoni, Jean-Didier Legat, Denis Flandre, David Bol, and Franc, ois-Xavier Standaert. Harvesting the potential of nano-CMOS for lightweight cryptography: an ultra-low-voltage 65 nm AES coprocessor for passive RFID tags. Journal of Cryptographic Engineering, 1(1):79-86, 2011.

[9] Lejla Batina, Jorge Guajardo, Tim Kerins, Nele Mentens, Pim Tuyls, and Ingrid Verbauwhede. Public-key cryptography for RFID-tags. In Pervasive Computing and Communications Workshops, 2007. PerCom Workshops' 07. Fifth Annual IEEE International Conference on, pages 217-222. IEEE, 2007.

[10] Yong Ki Lee, Kazuo Sakiyama, Lejla Batina, and Ingrid Verbauwhede. Elliptic-curve-based security processor for RFID. Computers, IEEE Trans-actions on, 57(11): 1514-1527, 2008.

[11] Dong Sam Ha and Patrick R Schaumont. Replacing cryptography with ultra wideband (UWB) modulation in secure RFID. In RFID, 2007. IEEE International Conference on, pages 23-29. IEEE, 2007.

[12] Pengyuan Yu, Patrick Schaumont, and Dong Ha. Securing RFID with ultra-wideband modulation. In Proceedings of workshop on RFID security (RFIDSec), pages 27-39, 2006.

[13] Ahmad-Reza Sadeghi, Ivan Visconti, and Christian Wachsmann. Enhancing RFID security and privacy by physically unclonable functions. In Towards Hardware-Intrinsic Security, pages 281-305. Springer, 2010.

[14] Srinivas Devadas, Edward Suh, Sid Paral, Richard Sowell, Tom Ziola, and Vivek Khandelwal. Design and implementation of PUF-based"unclonable" RFID ICs for anti-counterfeiting and security applications. In RFID, 2008 IEEE International Conference on, pages 58-64. IEEE, 2008.

[15] Blaise Gassend, Dwaine Clarke, Marten Van Dijk, and Srinivas Devadas. Silicon physical random functions. In Proceedings of the 9th ACM conference on Computer and communications security, pages 148-160. ACM, 2002.

[16] Stevan Preradovic, Isaac Balbin, Nemai Chandra Karmakar, and Gerhard F Swiegers. Multiresonator-based chipless RFID system for low-cost item track-ing. Microwave Theory and Techniques, IEEE Transactions on, 57(5): 1411-1419, 2009.

[17] Stevan Preradovic and Nemai C Karmakar. Design of fully printable planar chipless rfid transponder with 35-bit data capacity. In Microwave Conference, 2009. EuMC 2009. European, pages 013-016. IEEE, 2009.

[18] Md Aminul Islam and Nemai Chandra Karmakar. A novel compact printable dual-polarized chipless RFID system. Microwave Theory and Techniques, IEEE Transactions on, 60(7):2142-2151, 2012.

[19] Stevan Preradovic and Nemai Chandra Karmakar. Chipless RFID: bar code of the future. IEEE Microwave Magazine, 7(11):87-97, 2010.

[20] R Janaswamy and DH Schaubert. Characteristic impedance of a wide slotline on low-permittivity substrates (short paper). Microwave Theory and Techniques, IEEE Transactions on, 34(8):900-902, 1986.

[21] Cisco. Radio Frequency Fundamentals, September 2014.

[22] Jasim Ahmed, Hosahalli S Ramaswamy, and Vijaya GS Raghavan. 2007. Dielectric properties of butter in the MW frequency range as affected by salt and temperature. Journal of Food Engineering 82, 3 (2007), 351-358.

[23] Ali N Akansu, Wouter A Serdijn, and Ivan W Selesnick. 2010. Emerging applications of wavelets: A review. Physical communication 3, 1 (2010), 1-18.

[24] Alan Julian Izenman. 2013. Linear discriminant analysis. In Modern multivariate statistical techniques. Springer, 237-280.

[25] Bruno Sareni, Laurent Krahenbuihl, Abderrahmane Beroual, and Christian Brosseau. 1997. Effective dielectric constant of random composite materials. Journal ofApplied Physics 81, 5 (1997), 2375-2383.

[26] Jonathon Shlens. 2014. A tutorial on principal component analysis. arXiv preprint arXiv: 1404.1100 (2014).

[27] Diego F Silva and Gustavo EAPA Batista. 2016. Speeding up all-pairwise dynamic time warping matrix calculation. In Proceedings of the 2016 SIAM International Conference on Data Mining. SIAM, 837-845.

[28] K. Yang, D. Forte, and M. M. Tehranipoor. 2016. UCR: An unclonable chipless RFID tag. In 2016 IEEE International Symposium on Hardware Oriented Security and Trust (HOST). 7-12. DOI:http://dx.doi.org/10.1109/HST.2016.7495548

What is claimed is:

1. A chipless radio-frequency identification (RFID) tag for tracking a product, the chipless RFID tag comprising:
    a first substrate;
    a plurality of slot resonators fabricated on the first substrate, wherein each slot resonator has a characteristic resonance frequency value that randomly deviates from a theoretical resonance frequency value determined by a geometric dimension and a material property of both the slot resonators and the first substrate,
    wherein a resonance frequency signature of the tag is a collection of each of the plurality of slot resonators' characteristic resonance frequency value, and
    wherein the tag is integrated with, attached to, or printed on the product or a package thereof.

2. The tag according to claim 1, wherein the plurality of slot resonators are conductive.

3. The tag according to claim 1, wherein the plurality of slot resonators are I-shaped, U-shaped, C-shaped, split square-shaped, or circular ring-shaped.

4. The tag according to claim 1, wherein the plurality of slot resonators are circular ring-shaped.

5. The tag according to claim 4, wherein the plurality of slot resonators are arranged in a concentric configuration.

6. The tag according to claim 1, wherein the plurality of slot resonators comprise materials selected from elemental and alloyed metals, polymers, conductive ink particles, and nanoparticles.

7. The tag according to claim 1, wherein the first substrate comprises one or more materials having a dielectric constant in the range of 2-10.

8. The tag according to claim 1, wherein the first substrate comprises a ceramic-polymer composite, wherein a surface of the first substrate in contact with the plurality of resonators is covered with a layer of metallic material.

9. The tag according to claim 1, wherein the first substrate comprises glass-reinforced poly(tetrafluoroethylene) (PTFE) covered with a layer of copper.

10. The tag according to claim 1, wherein the resonance frequency signature of the tag is unclonable.

11. The tag according to claim 1, further comprising:
    a second substrate different from the first substrate;
    a standalone slot resonator fabricated on the second substrate; and
    a plurality of metallic particles embedded within the second substrate and having a defined melting temperature above which the metallic particles are free to move to a surface of the second substrate different from a location of the standalone slot resonator.

12. The tag according to claim 11, wherein the standalone slot resonator comprises the same material as, and has the same shape as, each of the plurality of slot resonators fabricated on the first substrate.

13. The tag according to claim 11, wherein the standalone slot resonator comprises a different material from, and has a different shape from, each of the plurality of slot resonators fabricated on the first substrate.

14. The tag according to claim 11, wherein the free movement of the metallic particles causes a shift in a resonance frequency of the standalone slot resonator.

15. The tag according to claim 11, wherein the second substrate comprises a material selected from grease and wax.

16. The tag according to claim 11, wherein the metallic particles are copper particles with a diameter ranging from 0.2 mm to 2.0 mm.

17. The tag according to claim 1, wherein the tag is integrated with a printed circuit board (PCB).

18. A method of enrolling a target chipless radio-frequency identification (RFID) tag in a centralized database, the method comprising:
    providing the target chipless RFID tag, wherein the target tag comprises a plurality of slot resonators fabricated on a substrate, wherein each slot resonator has a characteristic resonance frequency value that randomly deviates from a theoretical resonance frequency value determined by a geometric dimension and a material property of both the slot resonators and the substrate, wherein a resonance frequency signature of the tag is a collection of each of the plurality of slot resonators' characteristic resonance frequency value;
    determining a theoretical resonance frequency signature $\overline{v}_o$ of the target tag;
    scanning the target tag with a radio frequency (RF) signal;
    determining a characteristic resonance frequency signature $\overline{v}_i$ of the target tag;
    calculating the Euclidean distance $ED_0,i$ between $\overline{v}_o$ and $\overline{v}_i$; and
    storing $ED_0,i$ as an analog index of the target tag in the centralized database, wherein i denotes a digital index assigned to the target tag.

19. The method according to claim 18, wherein the plurality of slot resonators are circular ring-shaped.

20. A method of verifying the existence of a target chipless radio-frequency identification (RFID) tag in a centralized database, the method comprising:
    providing the target chipless RFID, wherein the target tag comprises a plurality of slot resonators fabricated on a substrate, wherein each slot resonator has a characteristic resonance frequency value that randomly deviates from a theoretical resonance frequency value determined by a geometric dimension and a material property of both the slot resonators and the substrate, wherein a resonance frequency signature of the tag is a collection of each of the plurality of slot resonators' characteristic resonance frequency value;
    scanning the target tag with an RF signal;
    determining a characteristic resonance frequency signature $\overline{v_{TUA}}$ of the target tag;
    calculating the Euclidean distance $ED_{0,TUA}$ between a theoretical resonance frequency signature $\overline{v}_o$ and $\overline{v_{TUA}}$; and
    verifying whether $ED_{0,TUA}$ exists in the centralized database.

* * * * *